United States Patent [19]

Giancarlo

[11] Patent Number: 4,768,190
[45] Date of Patent: Aug. 30, 1988

[54] PACKET SWITCHING NETWORK

[75] Inventor: Charles H. Giancarlo, Montclair, N.J.

[73] Assignee: OG Corporation, New York, N.Y.

[21] Appl. No.: 857,913

[22] Filed: Apr. 30, 1986

[51] Int. Cl.$^4$ ............................ H04J 3/00; H04J 3/24
[52] U.S. Cl. ........................................ 370/86; 370/94
[58] Field of Search .................... 370/85, 86, 88, 89, 370/60, 94; 340/825.05

[56] References Cited
U.S. PATENT DOCUMENTS 4,225,919  9/1980  Kyu et al. ........................... 370/89
4,383,315  5/1983  Torng ................................. 370/89

Primary Examiner—Douglas W. Olms
Assistant Examiner—Frank M. Scutch, III
Attorney, Agent, or Firm—Pennie & Edmonds

[57] ABSTRACT

A communications system is described in which a large number of endpoints communicate among one another in an orderly and protocol independent manner. The system is based on a short, fixed format packet which is switched among stations and within equipment in a contention-free manner without the use of general purpose processors. The system is distance independent, employs serial or parallel data paths, can use various media and can transport and switch data and digitized voice and video information in the same format and with the same equipment and transmission media. The effect of the system is to enable the construction of large metropolitan area networks which provide complete protocol conversion of all terminal types as well as transmission of data, voice, video and encrypted information.

8 Claims, 40 Drawing Sheets

NUMBER OF USER NODES VS NETWORK THROUGHPUT

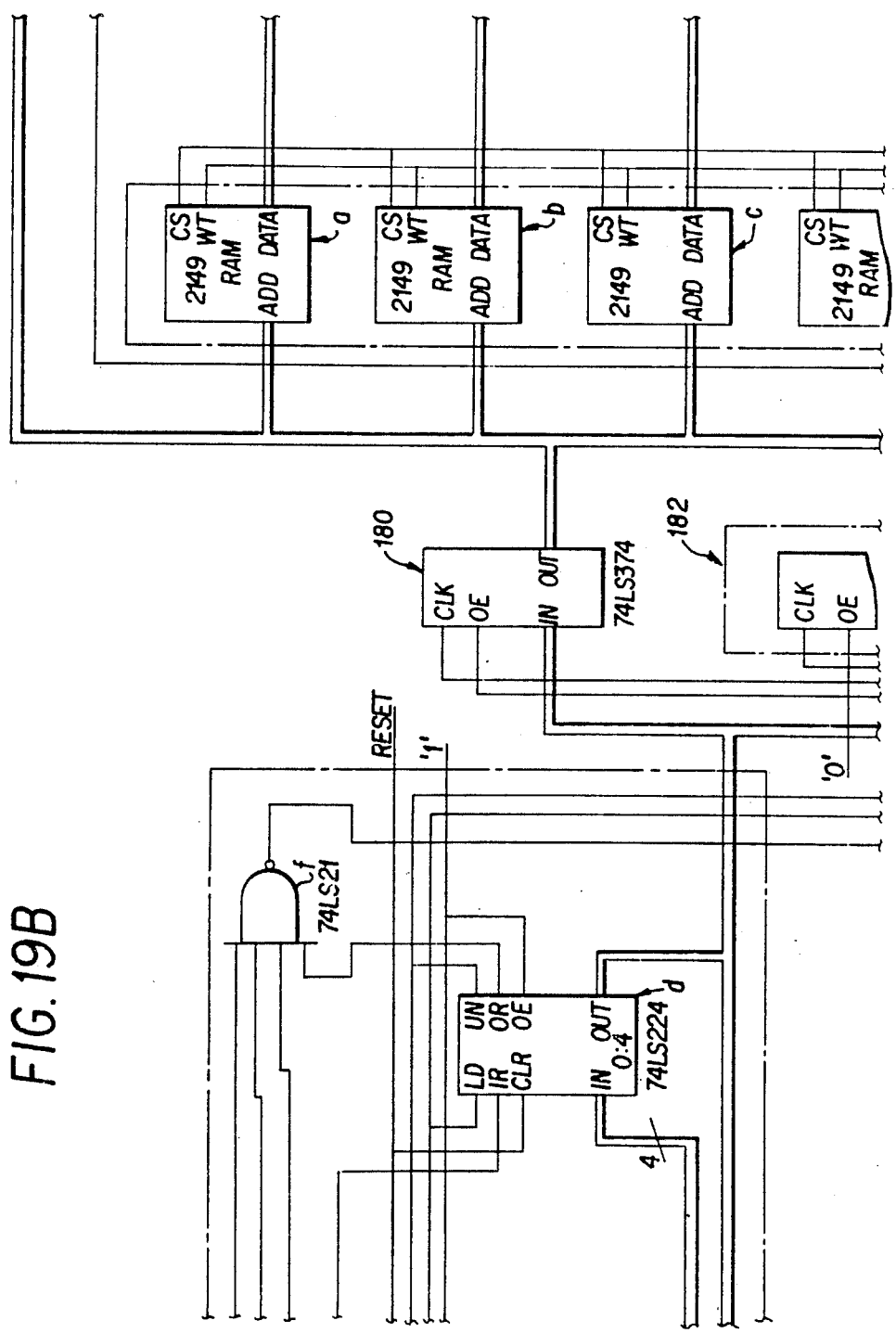

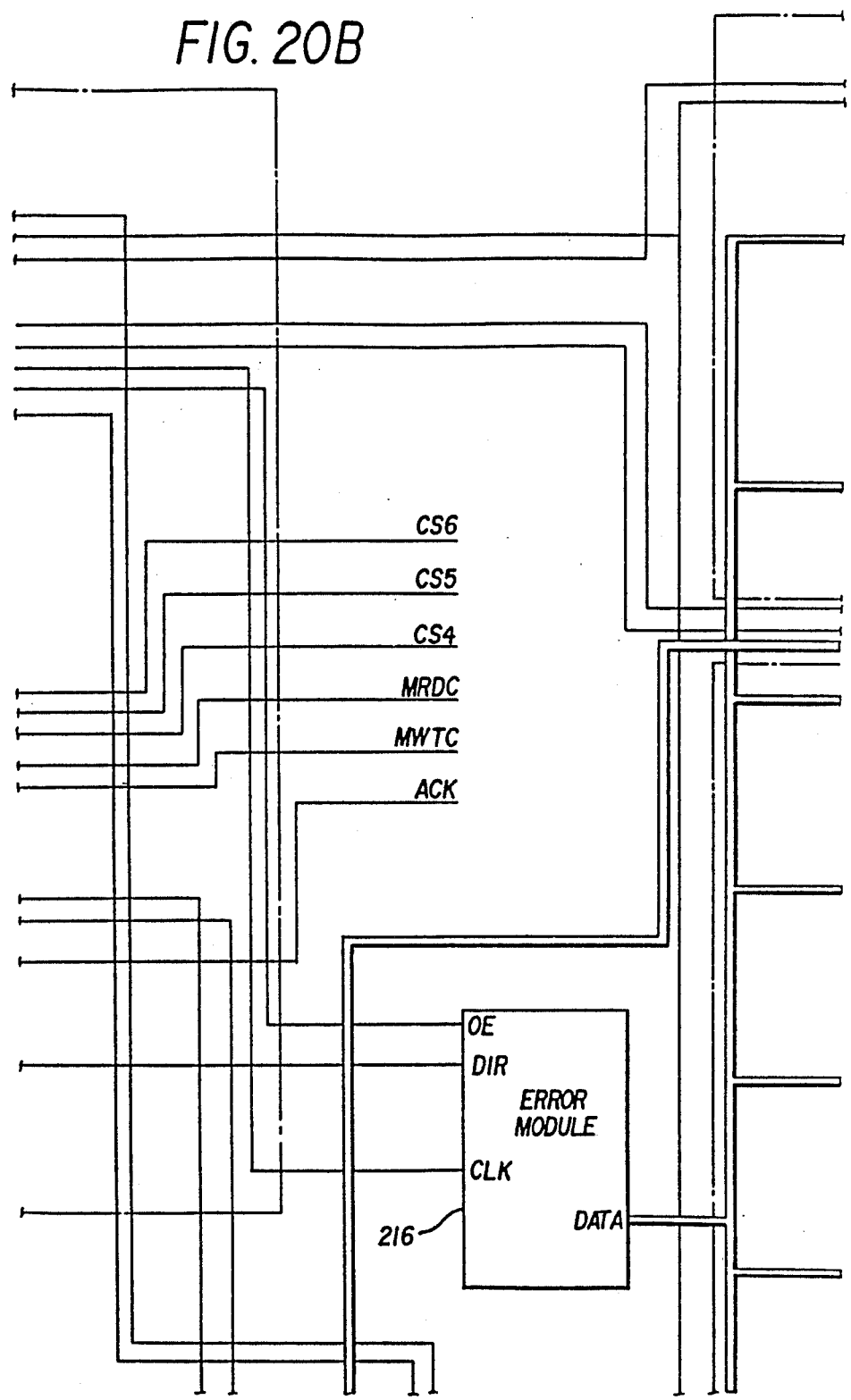

PACKET SWITCHING NETWORK

BACKGROUND OF THE INVENTION

The present invention relates to communications systems and more particularly to packet switching equipment called fast packet switching whereby data and real time digitized analog information are transmitted in limited length self addressed information packets.

One very common type of communications system is time division multiplexing and time-space-time switching. See, for example, AT&T Technical Journal, Volume 64, No. 6, Part 2, August 1985, and Gordon et al., U.S. Pat. No. 3,749,845. In such a system, a large number of endpoints are connected to a central switch which switches a fixed bandwidth from one endpoint to another. Connections are made at call initiation by a central processing unit and call arbitrator. Multiplexing and switching of the fixed bandwidth circuits can be distributed through the use of many switches and multiplexers arranged in tree structures.

Fixed bandwidth communications channels can provide for both digitized voice and data transfer. Data transfer, however, typically requires protocols at the endpoints of the circuit outside the network to ensure an orderly, efficient and understandable communication between data terminals.

An improved prior art scheme for transmission of data is revealed in A. G. Fraser, U.S. Pat. No. 3,749,845. In this system, transmission occurs with the use of limited, but variable, length information packets. Each packet contains all information required to direct itself to the proper endpoint. This information includes flow control information, error detection, sequencing, line protocol, and session control. The parts of the packet which contain this information will hereinafter be called overhead fields and will be referred to generally as overhead.

The packets of information can generally vary in length from approximately 10 bytes to over 1024 bytes of data. Fields containing the overhead information change length, structure and identity depending on the information contained therein. Because of the complex structure of the packet, the packets are switched at switching points with the use of computer processors. Processors identify, store and route packets from switch to switch and ultimately to their final destination.

An important characteristic of this communication system is that the protocol of the transmitting station is generally unchanged at the receiving station. Another characteristic is that switching and transmission require complex computer processing of the data packets. These characteristics limit the speed of end-to-end communications because of the need for processors running communications protocol software. Other characteristics are that prior art equipment based on this technique is non-deterministic, has too great a communication delay, and is too slow for voice or video applications.

Modifications of this system are found in two systems for communicating in a local environment described in Metcalfe et al., U.S. Pat. No. 4,063,220 and Janson et al., U.S. Pat. No. 4,482,999. These systems use packet switching techniques within a line protocol which allows many stations to communicate by contending for a single transmission media. They do not rely on a single switch or arbiter to control transmission and therefore the failure of any station will not cause a failure of the entire network. While these systems provide flow control and other transport, network, and line protocols, they typically do not provide session support or presentation protocol support and, therefore, do not allow dissimilar terminals, processors and computers to communicate with each other directly without other protocol conversion equipment or software present. Moreover, since these systems also use computer processors and software processes to perform communications functions of flow control and error control, end-to-end transfer of data is relatively slow.

Another prior art scheme is exemplified in the papers S. R. Amstutz, "Burst Switching - An Introduction", IEEE Communications, November 1983 and E. F. Haselton, "A PCM Frame Switching Concept, Leading to Burst Switching Network Architecture" IEEE Communications, September 1983. This system has the ability to switch both voice and data in a common media. It allows for efficient multiplexing of fixed bandwidth channels for short periods of time by switching variable length packets traveling on 64 kilobit per second time division segments of a 1.5 megabit per second transmission line. After the end of a packet has passed, any other station may use the 64 kilobit per second segment. However the system does not handle the various transport protocols necessary for efficient end-to-end data communications. Moreover, since the system operates by switching fixed time segments of one or more 64 kilobit per second bandwidth channels, it does not lend itself well to digitized analog or data transmission where the speed of transmission is either greater or less than 64 kilobits per second.

Lastly, a prior art scheme known as fast packet switching exemplified by Turner, U.S. Pat. No. 4,491,945 is able to handle voice and data traffic in the same packet format and therefore overcomes many of the problems of previous methods. This method uses a Banyan type switching element to route data from beginning to destination. Packets travel along high speed transmission lines which are distance independent. Generation rates determine the bandwidth used in the system. However, Turner's system is very complex and requires high density VLSI integrated circuits. It requires many address translations as the packets travel within the system requiring elaborate set up procedures and consequently long session start up times. The system does not provide a method to achieve multiple sessions for an individual endpoint, nor does it address the problem of protocol conversion. It also requires the use of computer processors to provide the large amount of software protocol necessary for efficient data communications. Finally, Turner's system is not able to handle high bandwidth video or data traffic.

One problem posed by the prior art is the inability to simultaneously handle both data and digitized voice and video transmissions. Another problem is the intensive use of computer processors to perform data communications which severely limits the speed of data transmission and precludes the use of these processors to perform tasks other than data transmission such as protocol conversion. Another problem is the inability to allow comprehensible and meaningful communication between data terminals and computers of different types. Other problems include the inability to handle high speed data transfer, the inability to provide end-to-end session level encryption of voice or data, and the lack of a facility for providing multiple sessions or conversations to a single endpoint or using device.

SUMMARY OF THE INVENTION

In the present invention, short, fixed format packets are switched using a modified collision-free register insertion technique. The packets are switched on, off and around the ring using hard-wired state machine circuitry which is extremely fast in nature. Thus, no computer processor is required to switch packets to their final destination. Endpoints have similar state machine switches to switch packets as well as circuitry designed to deliver the data or digitized voice or video directly to memory or transceiver without involving a computer processor. Similarly, circuitry is provided which fetches data from memory or digitized voice or video from transceivers at a predetermined rate without processor involvement. A processor is used for high ISO level functions such as session creation, destruction and support, data buffer management, error acknowledgement, presentation protocol conversion, and terminal services and applications level software support.

As a result, the invention provides end-to-end transfer rates of over 16 megabits per second, terminal and computer protocol conversion for the endpoints, multiple concurrent session capability for the endpoints, and other terminal services using only inexpensive and relatively simple hardware and minimum software. The communications system and switching technique of the present invention provide for fast and efficient transmission of voice, data and video traffic, allows terminals and computers to communicate together without the need for other protocol conversion equipment or software, allows transmission of digitized voice and video of various formats, provides all protocols and mechanisms necessary for the efficient and comprehensible transmission and reception of data, increases the efficiency of existing transmission media, and easily integrates into the existing telecommunications infrastructure.

BRIEF DESCRIPTION OF THE DRAWINGS

These and other objects, features and elements of the invention will be more readily apparent from the following description of a preferred embodiment of the invention in which:

FIGS. 20A-F are a circuit diagram of the packet assembler circuit of FIG. 10.

DESCRIPTION OF THE PREFERRED EMBODIMENT

Figure 1:
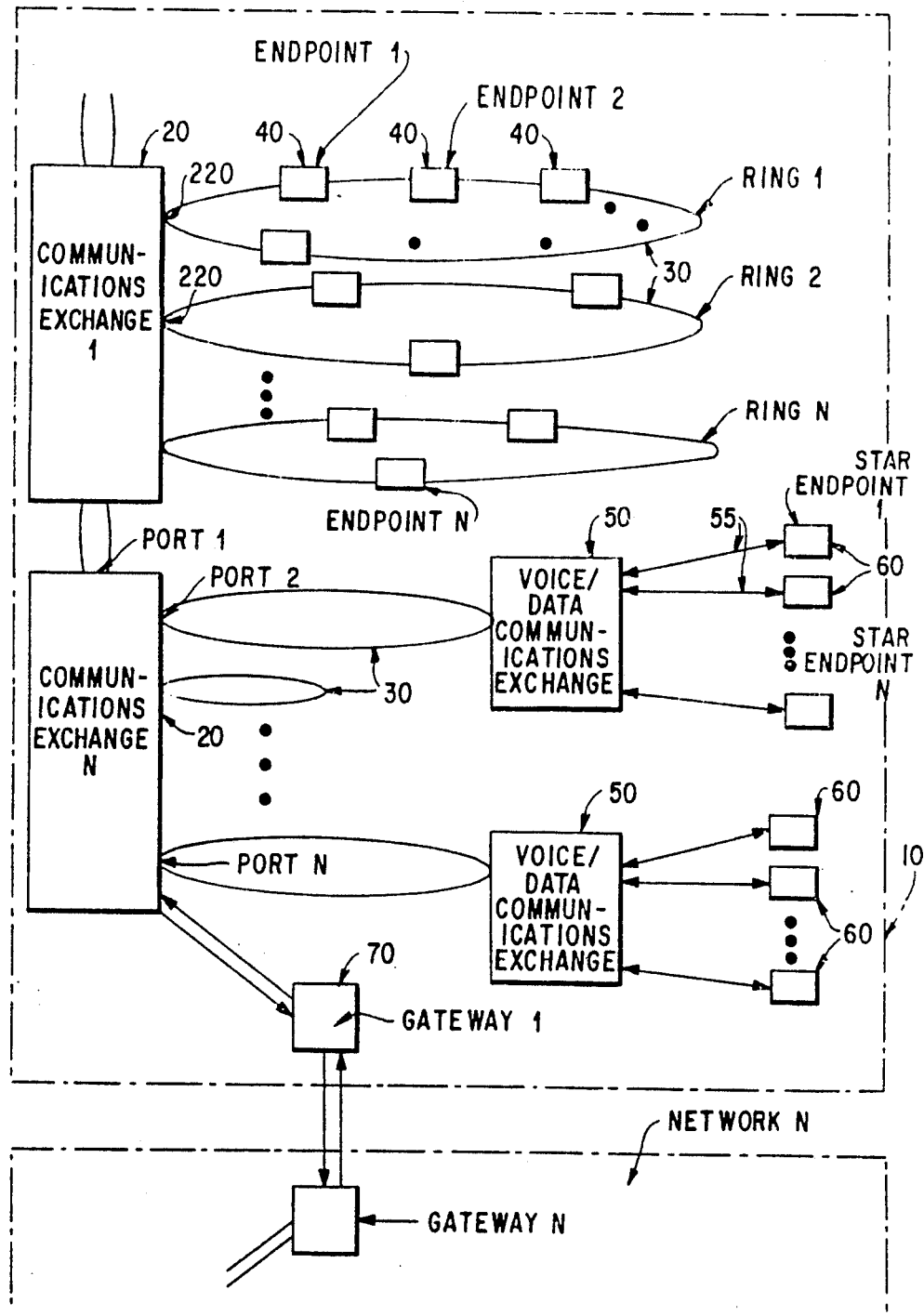
FIG. 1 is a block diagram showing a multi-endpoint, multi-exchange communications network in which the invention is embodied.

FIG. 1 shows a block diagram of a communications network 10 which embodies the invention. The network comprises communications exchanges 20, rings 30, ring endpoints 40, voice/data communications exchanges 50, star endpoints 60 and gateways 70. Each of these elements also bears a device label and a distinguishing number from 1 to N. Communications exchanges 20 are high capacity switches that are connected by a parallel internal ring as more fully described below. Voice/data communications exchanges 50 are high capacity switches that are connected by a partially parallel ring. Rings 30 and ring endpoints 40 are used for data transmission. Voice/data communications exchanges 50 and star-wired endpoints 60 provide for switching and transmission of voice, data and digitized information. Endpoint 60 uses a full duplex line 55 for communication with voice/data communications exchange 50. Endpoints 40 and 60 provide the connections to using devices (not shown in FIG. 1) such as a terminal, a computer, a computer peripheral, a telephone, a video screen, a local area network, or any one of many tranmission interfaces. The endpoints serve as communications connections and as protocol converters for using devices. Gateways 70 interface networks 10 to one another.

The invention is directed to defining the architecture of these devices and their interconnection, the protocol of transmission of signals at the endpoints, and the structure of the transmissions, such that data and digitized information is transmitted from sender to receiver with minimum delay at maximum speed and with minimal computer processor involvement.

Figure 2:
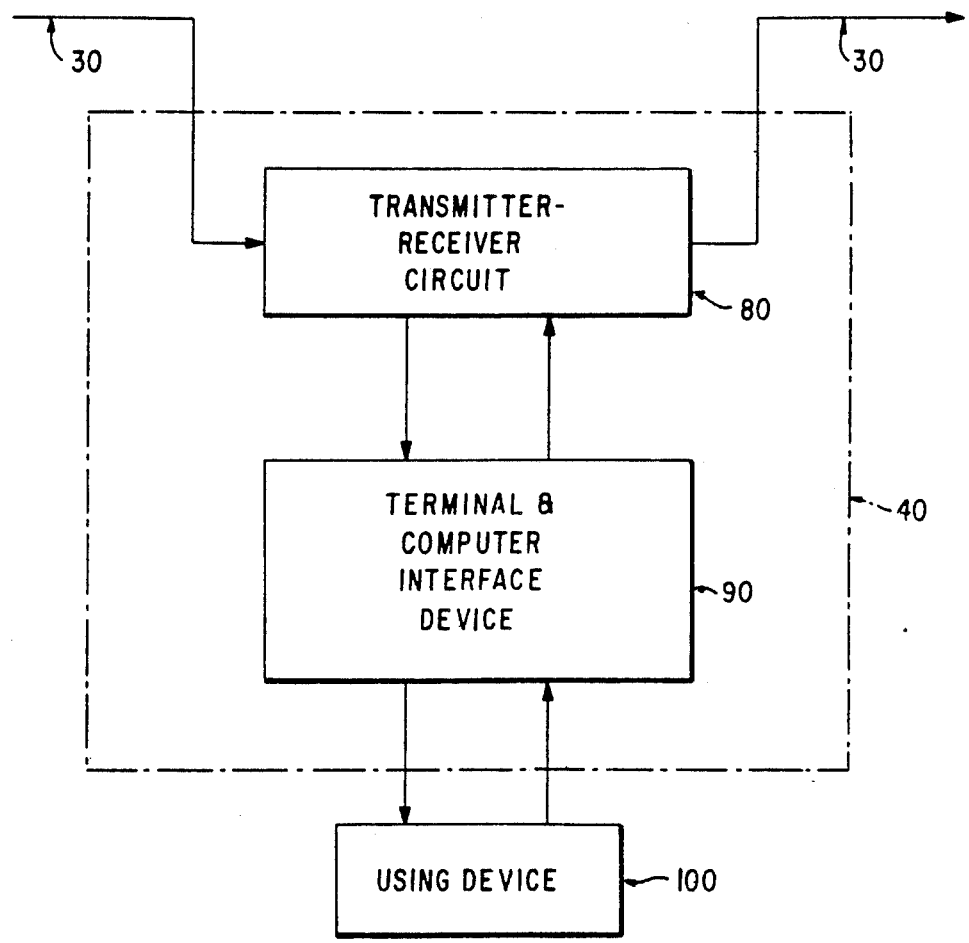
FIG. 2 is a block diagram showing the elements of an endpoint.

As shown in FIG. 2, each endpoint 40 comprises a transmitter/receiver unit 80, a terminal and computer interface device 90, and a using device 100. Transmitter/receiver unit 80 receives data from the ring and places it into terminal and computer interface device 90 and transmits data from the terminal and computer interface device onto the ring. The transmitter/receiver unit also packetizes and depacketizes the data and performs a large amount of data transfer without supervision of the terminal and computer interface unit. The terminal and computer interface unit converts data received from the ring to a form suitable for use by the using device and converts data received from the using device to a form compatible with other using devices on network 10.

Figure 3:
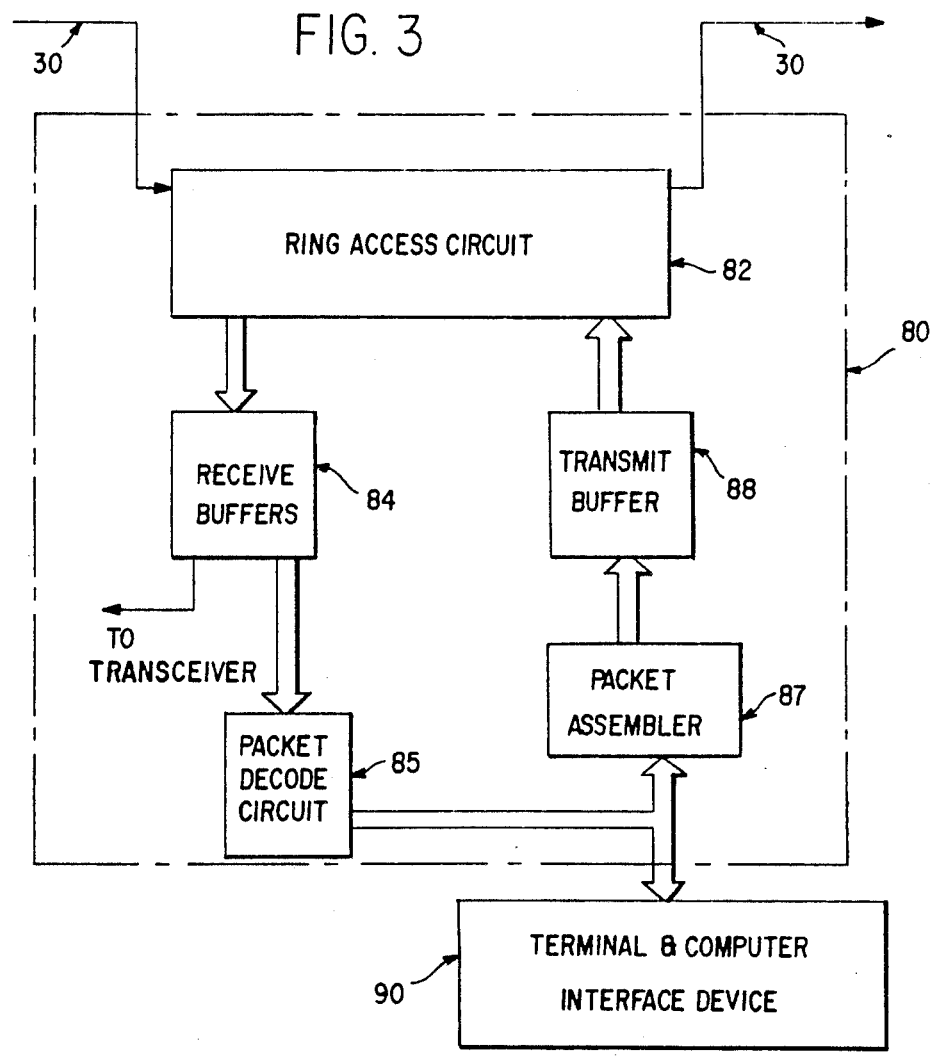
FIG. 3 is a block diagram showing a transmitter/receiver circuit within an endpoint.

FIG. 3 shows a block diagram of a transmitter/receiver unit 80 of FIG. 2. The transmitter/receiver unit comprises a ring access circuit 82, receive buffers 84, packet decode circuit 85, packet assembler 87, and transmit buffer 88. Ring access circuit 82 acts independently of the ring access circuit of every other endpoint yet allows end-to-end transmission of the data packet. This is possible because receptions and transmissions are handled by fixed rules which govern access to the ring 30. The same ring access circuit is used in every form of the invention in serial, parallel and hybrid parallel-serial forms. It is the central switching element which is used in endpoints, communications exchanges and voice-/data communications exchanges.

Figure 8:
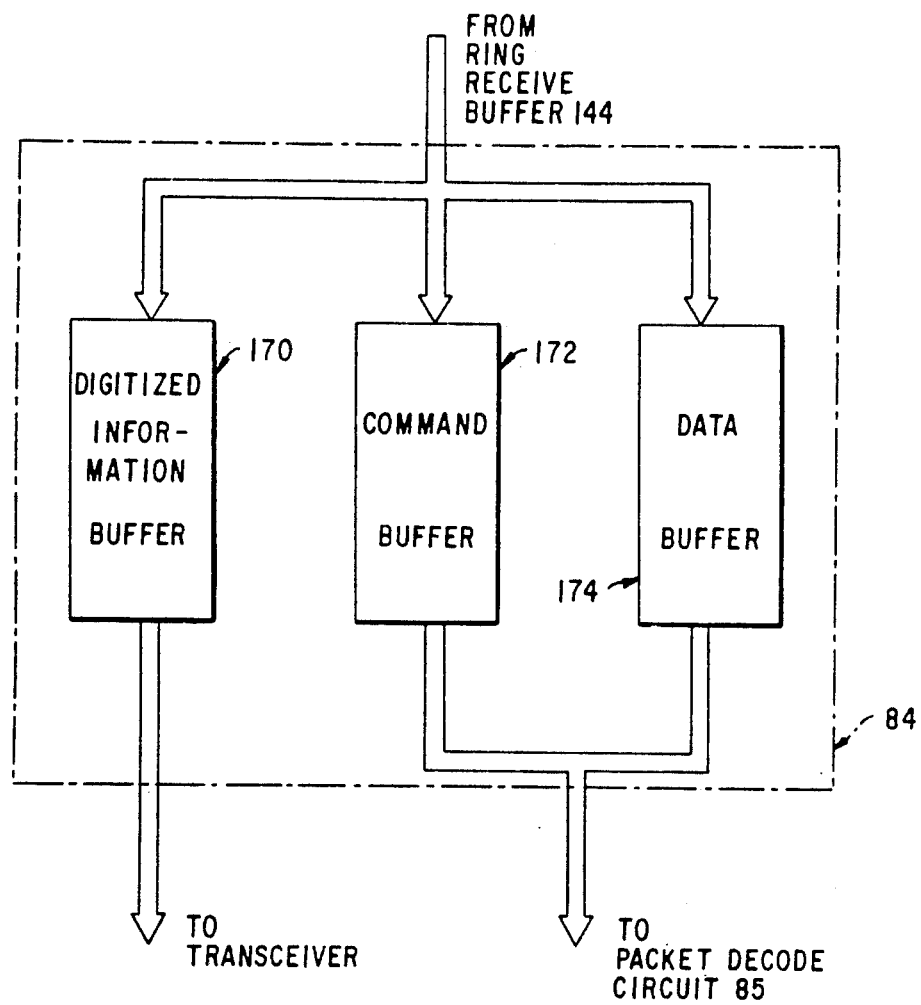
FIG. 8 is a block diagram of three receive buffers which may exist in the receive buffers circuit within an endpoint.

The ring access circuit makes available to the receive buffers 84 valid messages that have been received and accepts from the transmit buffer 88 outgoing messages when no other outgoing message exists in the circuit. As shown in FIG. 8, receive buffers 84 comprise three buffers: a digitized information buffer 170, a command packet buffer 172 and a data buffer 174. Receive buffers 84 take messages from the ring access circuit when there is room in the buffers and place such messages in the appropriate buffer 170, 172, 174. Digitized analog information messages may then be made available to the transceivers of using devices 100. Data and control messages are passed to the packet decode circuit 85 where the packets are disassembled and the data is placed directly into the memory of the terminal and computer interface device 90. Data to be transmitted is taken from the terminal and computer interface device by the packet assembler 87, which packetizes the data and places the packets into the transmit buffer 88 where it waits until it is accepted by the ring access circuit.

Figure 4:
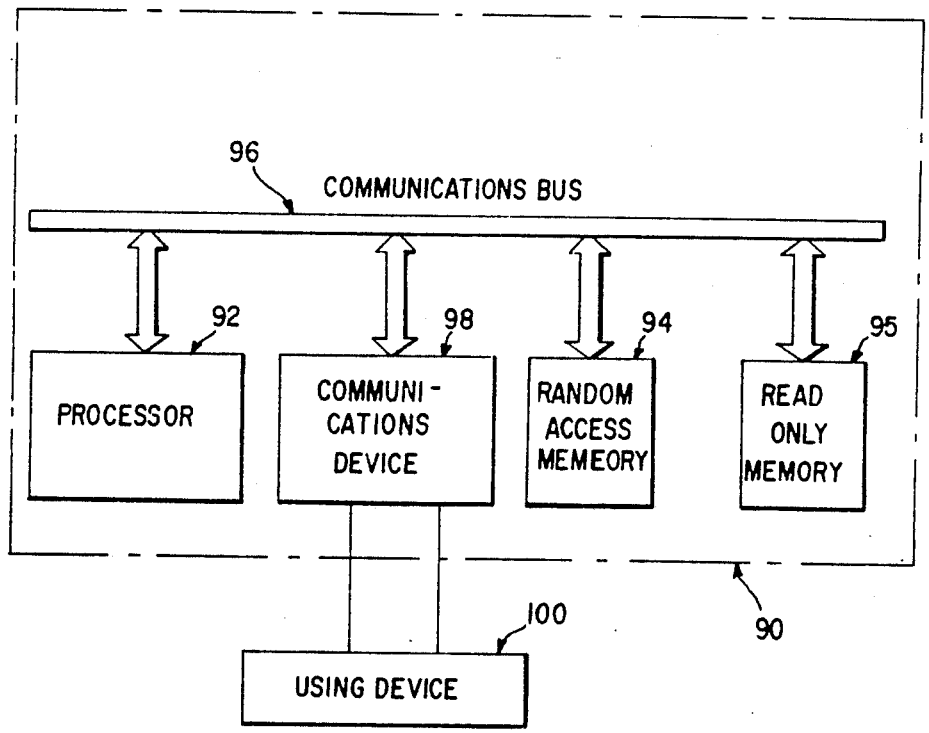
FIG. 4 is a block diagram of a terminal and computer interface device within an endpoint.

FIG. 4 shows a conventional computer processing circuit which is used for the terminal and computer interface device 90. It consists of a computer processor 92, a random access memory (RAM) 94, a read only memory 95 which contains program information, a communications bus 96 and a communications device 98 which provides correct line protocols for the using device 100. Illustratively, this computer processing circuit is an Intel i86 microprocessor system.

Figure 5:
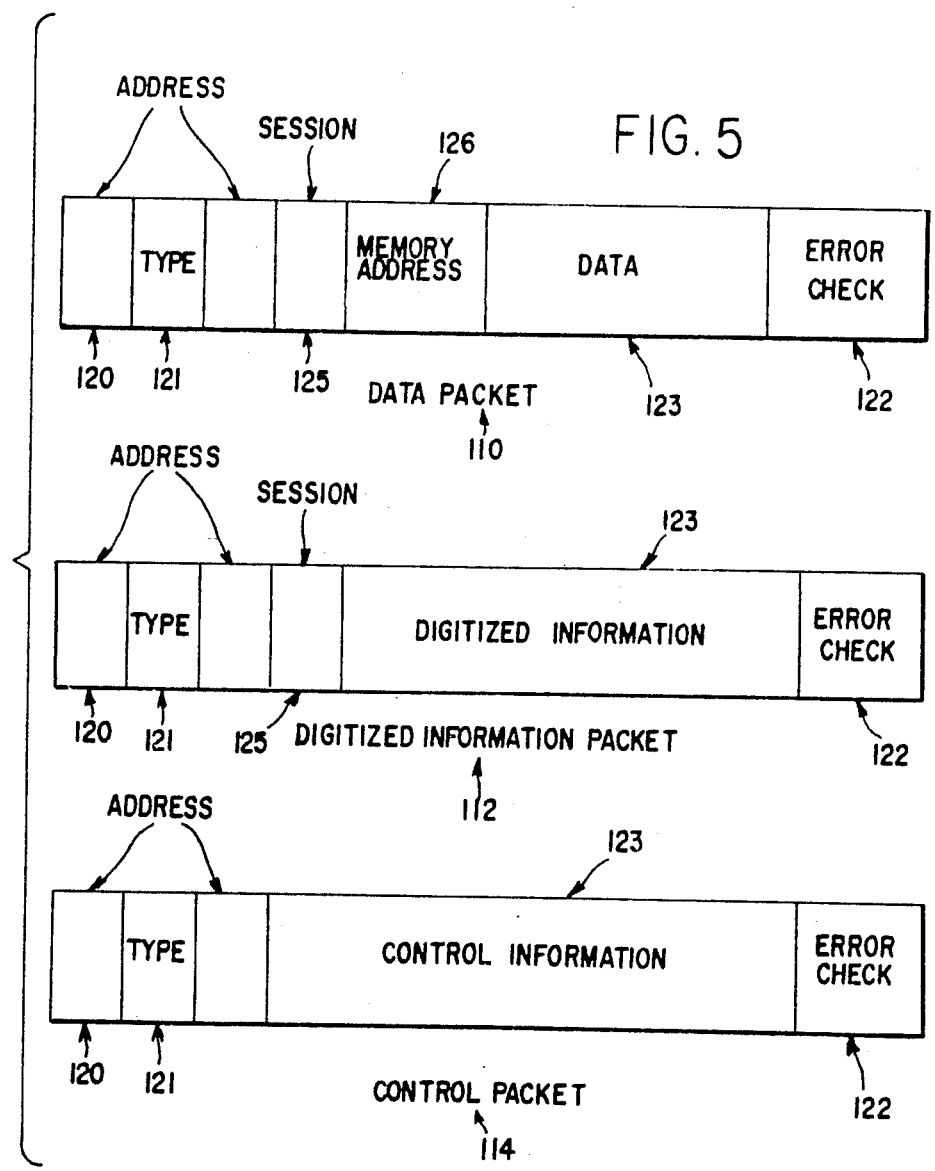
FIG. 5 is a graphic representation of three types of packets transmitted by the invention and used by the system.

The message packets which are used by the invention are depicted in FIG. 5. Three types of packet are utilized: data packets 110 for transmission of computer information; digitized information packets 112 for transmission of voice, video and other time critical real time information; and control packets 114 for communication between the endpoints of the invention themselves. These packets have four fields in common: address field 120 and type field 121 are used to switch and route the packets within the network, error field 122 is used to verify the information within the packet, and data or information field 123 is used to carry the using device's information. Illustratively the address field is sixteen bits long, up to eight bits being used to specify the address of the endpoint and the remaining bits being available to specify the address of the ring in which the endpoint is located. The type field is eight bits. The three types of packets are distinguished by bits in the type field. Another type field bit designated the RND bit indicates that the packet is addressed to an endpoint whose address is lower than or equal to that of the endpoint from which the packet originates.

The length of the message can be fixed for any particular configuration and is typically less than 300 bits. The short length of the message packet ensures that transmission delay is minimized while the fixed format of the packet allow simple hardware to perform the switching and comaunications functions. The message length may be discretely variable by using several bits in the type field to describe the length. For example, the message may have discrete lengths of 96, 192, 288, and 384 bits as specified by two bits in the type field.

The address, type and error fields are used solely by the ring access logic and are the only fields used by this logic to route the packets from start to destination. Data and digitized information packets also have a session number field 125 of eight bits to distinguish packets according to which conversation with the particular endpoint their contents refer. Data packets have in addition a virtual memory address field 126 of sixteen bits used to properly place their contents into the memory of the terminal and computer interface device or into the memory of the using device.

Figure 6:
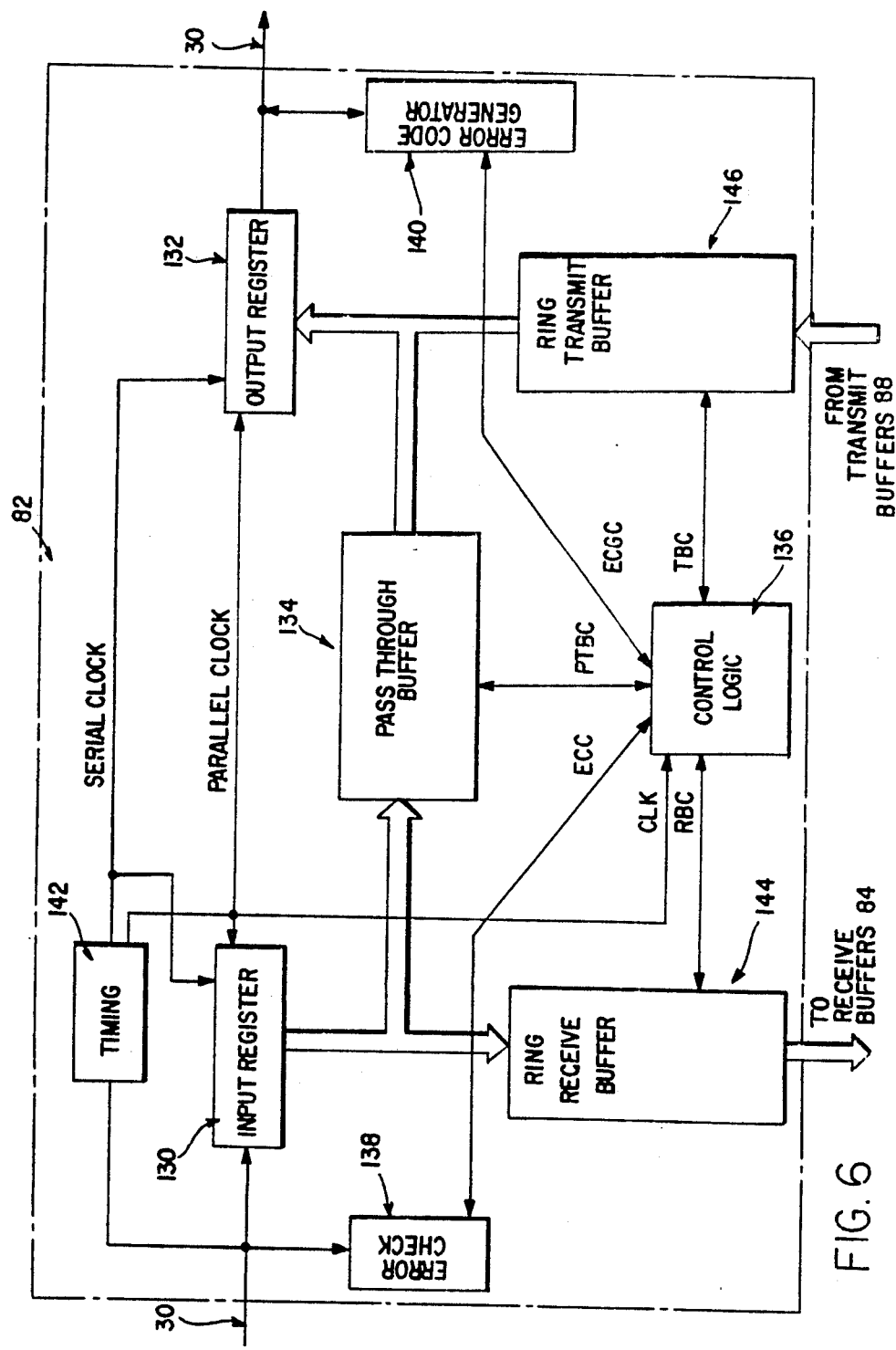
FIG. 6 is a block diagram of a ring access circuit within the transmitter/receiver circuit in an endpoint.
Figure 7:
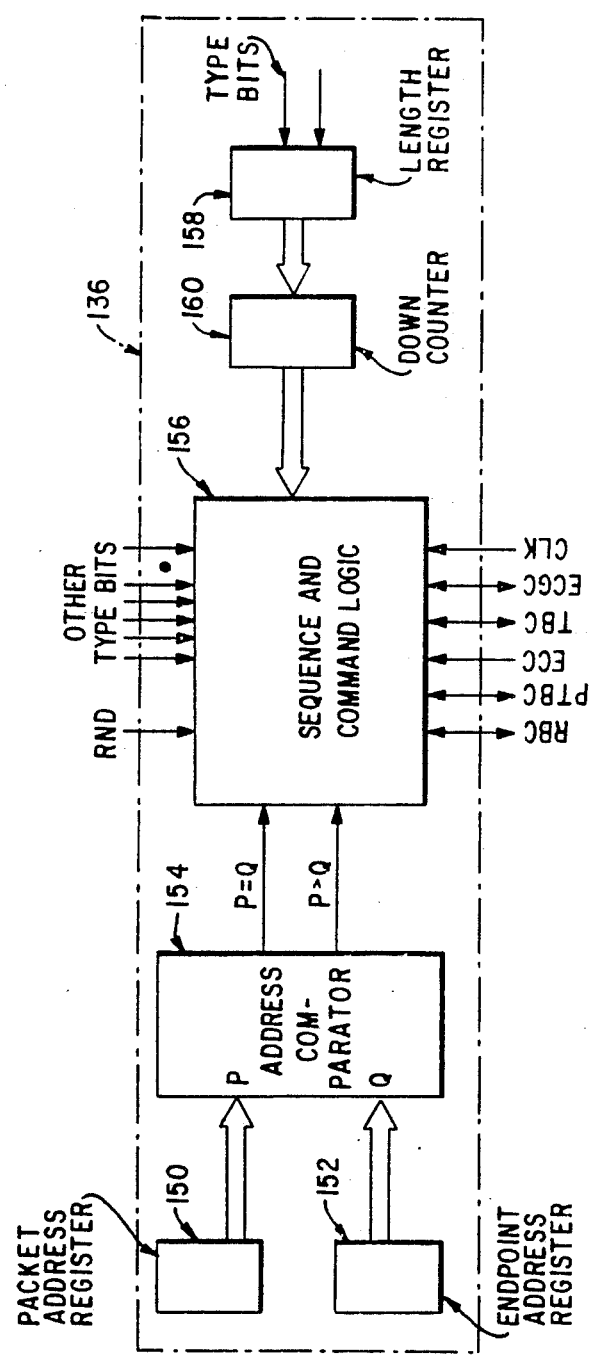
FIG. 7 is a block diagram of control logic in the ring access circuits.

FIG. 6 is a block diagram of the ring access circuit 82 within a ring endpoint. Circuit 82 comprises an input shift register 130, an output shift register 132, a pass through buffer 134, control logic 136, an error check circuit 138, an error code generator 140, a timing circuit 142, a ring receive input buffer 144 and a ring transmit buffer 146. As shown in FIG. 7, control circuit 136 further comprises packet address register 150, endpoint address register 152, comparator 154, sequence and command logic 156, length register 158 and down counter 160. Further details of this circuit are disclosed in FIGS. 18A–F discussed below.

Each successive endpoint on the ring has a physical address assigned to the endpoint address register 152 by hardware or software in the system. The assigned addresses must change monotonically for each successive endpoint in the ring (i.e. they all must increase in succession around the ring or they all must decrease in succession). For purposes of illustration, we will assume that the addresses increase in succession. The numerically lowest addressed endpoint is designated the checkpoint and has some special hardware and software functions. The checkpoint must always reset the RND bit in the type field and it also does not pass on an incoming packet that does not have this bit set. The checkpoint also generates the timing information which is regenerated and used by every other endpoint. The checkpoint may also be used to provide power and timing signals to the other endpoints or store a directory of the users of the network and their operating characteristics. Every ring including the parallel rings of the communications exchanges requires a checkpoint.

Figure 10:
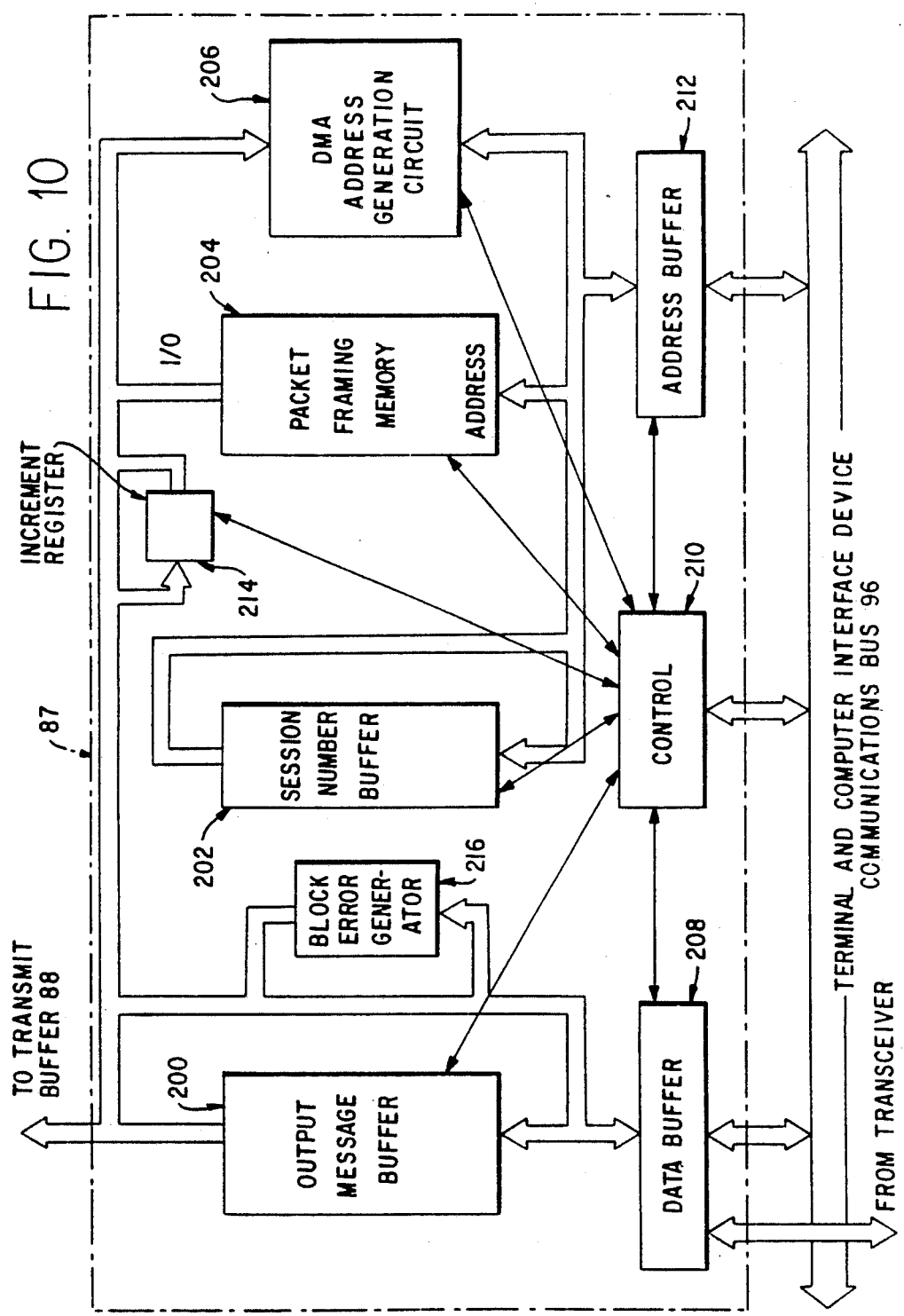
FIG. 10 is a block diagram of a packet assembler circuit within the transmitter/receiver circuit of an endpoint.

The modified register insertion technique of ring access ensures that transmission is collision free. Message packets from the using device associated with an endpoint are not placed on the ring unless bandwidth exists on the ring for the message packet. Message packets transmitted to an endpoint by prior endpoints on the ring are intercepted and placed in a buffer until the instant endpoint has transmitted any single packet from the using device associated with the endpoint. Buffered message packets then have priority over other packets from that using device until the buffer is empty. Only when the pass through buffer is empty can further transmission of packets from the using device take place. This ring access mechanism can be used in serial, parallel and partially parallel formats. The apparatus of FIGS. 6 and 7 is a ring access circuit for serial formats and that of FIG. 10 is a circuit for parallel or partially parallel formats.

Ring access circuit 82 monitors the address and type fields 120, 121 of received message packets, the state of the ring receive buffer 144 and receive buffers 84 and the state of the ring transmit buffer 146. Reception is initiated when a message packet is shifted into input register 130. The message packet must have valid address and type fields or it will be ignored. To be valid, the address must be equal to or greater than the assigned address of the receiving endpoint, or the type field must indicate that the message belongs to certain valid message categories. The comparisons are performed by the address comparator 154 and the sequence and command logic 156 within the control logic 134. If a message packet is received which has an address greater than the assigned address, the message packet is passed on by passing through the pass through buffer 134 and output register 132. The control logic 136 only requires the address and type fields of the message packet to make this determination and therefore does not have to buffer the entire message but only its first 16 to 24 bits. However, error check field 122 is always intercepted and provided to error check register 138, checked on reception, recalculated for each transmission and appended to the tail of the message. The length register 158 and down counter 160 control the sequence logic 156 such that the entire packet is properly loaded into the ring receive buffer 144 or passed to the output register 132 for each of the various possible packet lengths.

Timing information can be regenerated by timing circuit 142 from the incoming message packets, regenerated from timing information sent from the checkpoint with the messages, or obtained from a central timing source.

Error checking is handled by error check register 138 and error code generator 140 in the transmitter receiver circuitry. An individual packet error check is made on each packet using the error check field 122 by performing a mathematical comparison on the entire message packet while the error field is in the error check register 138. All received packets are checked. Transmitted packets including packets which are being passed through have the error field recalculated and appended to the packet by the error code generator 140. Various error codes and field lengths may be used as long as the transmitter and receiver use the same technique. Preferably, error correction circuitry is used in addition to error detection circuitry. If errors are detected and cannot be corrected, the message packets are ignored.

If a message packet is received which is addressed to the endpoint, address comparator 154 notes the identity of the message packet address and the endpoint address and sequence and command logic 156 places the message packet in the proper receive buffer 84, either digitized information buffer 170, command packet buffer 172 or data buffer 174.

Messages in the digitized message buffer 170 are passed to the using device when the using device transceiver requests the information. Messages in the data buffer 174 are decoded using the session and virtual memory address fields 125, 126 in the packet and are placed directly into the memory 94 of the terminal and computer interface device or directly into the memory of the using device itself.

If the buffer is full, the message is either retransmitted and directed to return or is ignored and error routines may be implemented. In general digitized voice and video information messages are ignored if the digitized information buffer 170 is full while data messages are replaced on the ring and directed to return to the same endpoint if data buffer 174 is full. This is accomplished by setting the RND bit, in effect indicating that the packet is addressed to an endpoint having a lower address. The checkpoint will then pass on this packet while clearing the RND bit. This procedure allows voice traffic to be transferred to its destination with minimum delay while data traffic is transferred with minimum error. In principle, digitized analog information may have some error without causing the user significant trouble but once the information is old it is no longer of any value. Data transmission, on the other hand, cannot tolerate error but may tolerate significant delay. Thus digitized analog traffic has priority over data but is ignored if it arrives late whereas data is delayed but never ignored when received by an endpoint.

If a message is received whose type field indicates that this class of message should be accepted by the receiver, then the message is placed in one of the receive buffers 84 if there is room. This type of message is also retransmitted so that other endpoints can examine it. If no room exists in the buffer for the message it is either retransmitted and directed to return, or it is ignored but retransmitted for use by other stations.

In the case of transmission from an endpoint, the ring access control logic checks for the state of the pass through buffer 134 once a full message packet has been assembled in the ring transmit buffer 146. If the pass through buffer is currently empty and the message ready signal is not asserted, then the message packet in the transmit buffer is passed to output register 132 and is put on the ring. Should a message packet be received from the ring while a message packet is being transmitted from buffer 146, the received message packet is momentarily delayed by being passed into the pass through buffer. This buffer is immediately emptied when the transmitted message packet has been sent.

Figure 17:
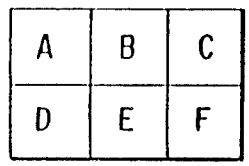
FIG. 17 is a sketch illustrating how the six sheets of FIGS. 18, 19, 20 and 21 are fitted together.
Figure 18A:
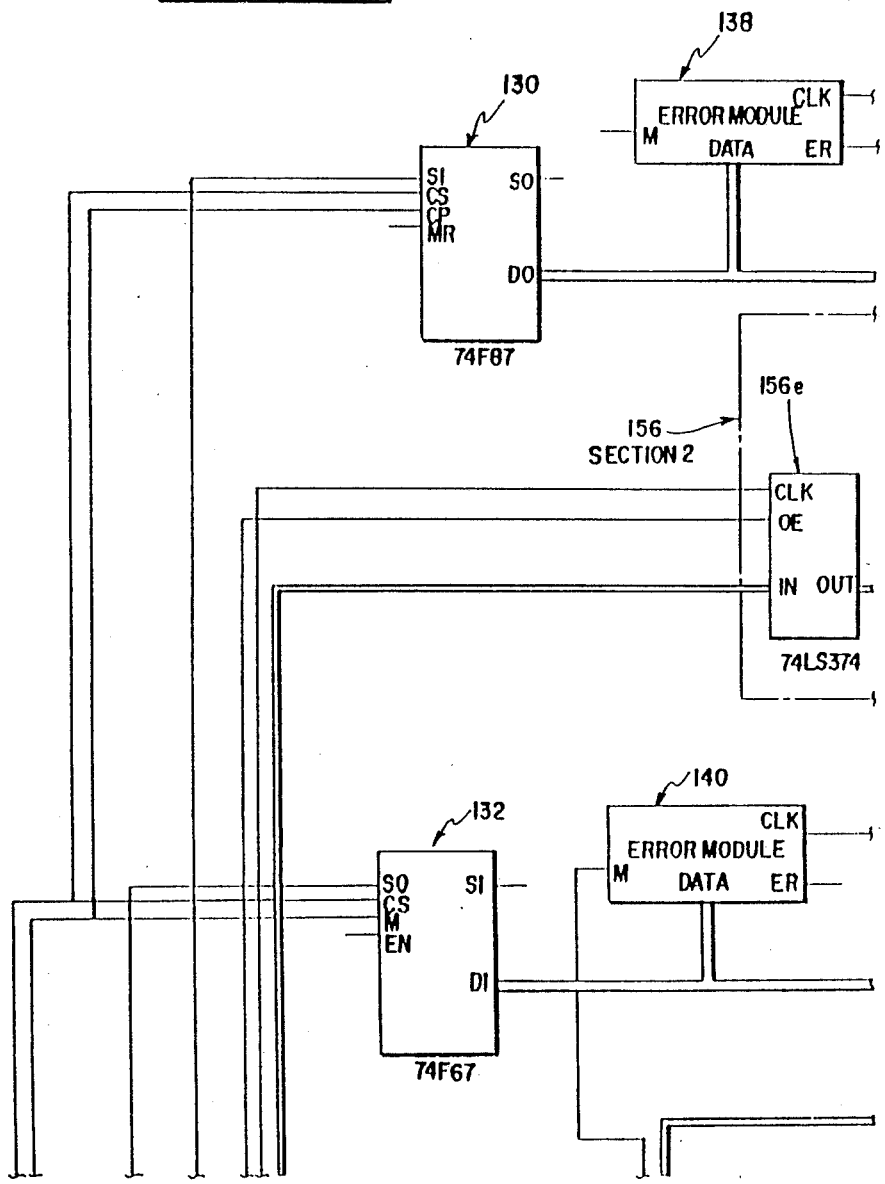
FIGS. 18A-F are a circuit diagram of the ring access circuit of FIGS. 6 and 7.
Figure 18B:
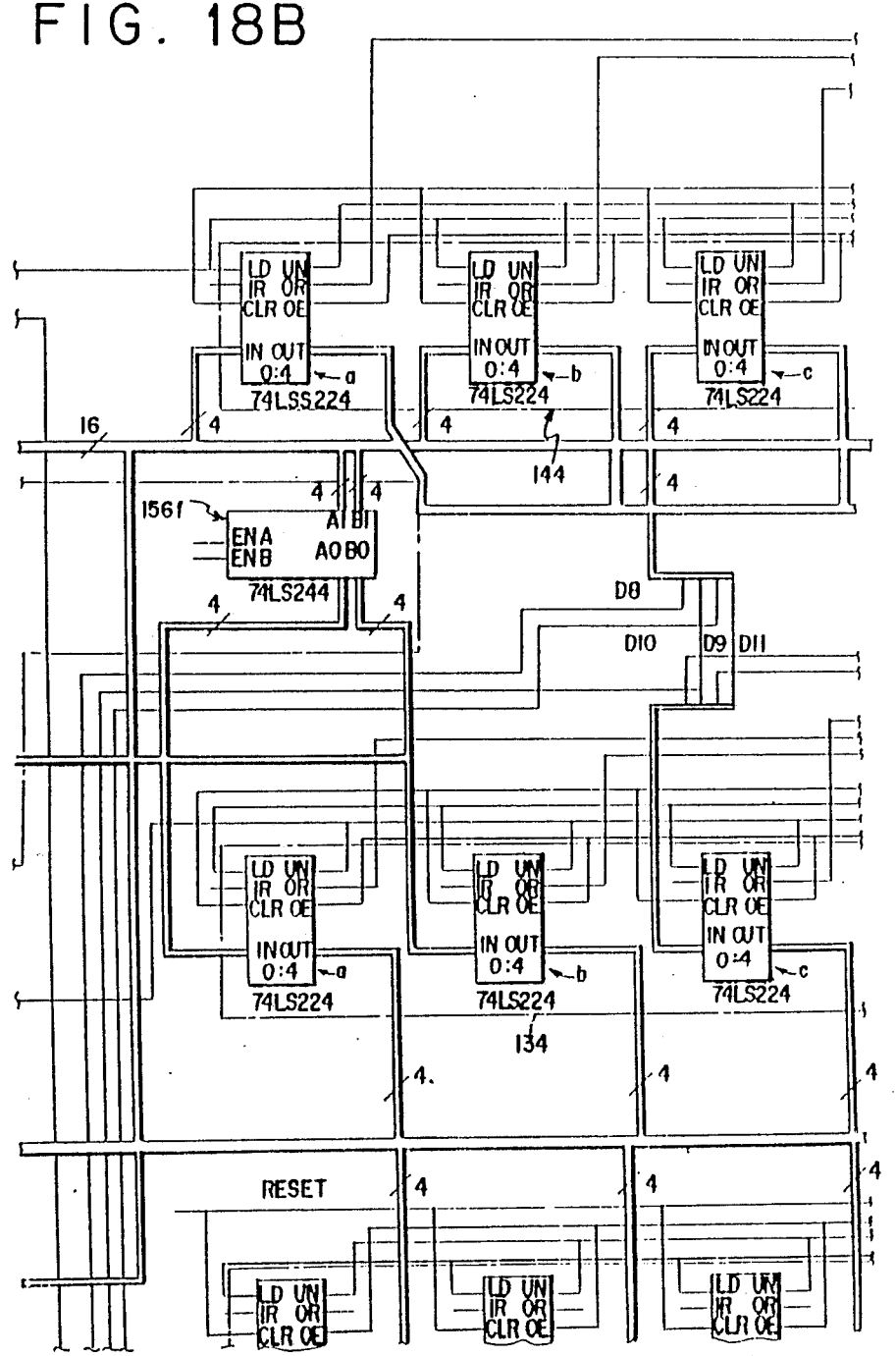
Figure 18C:
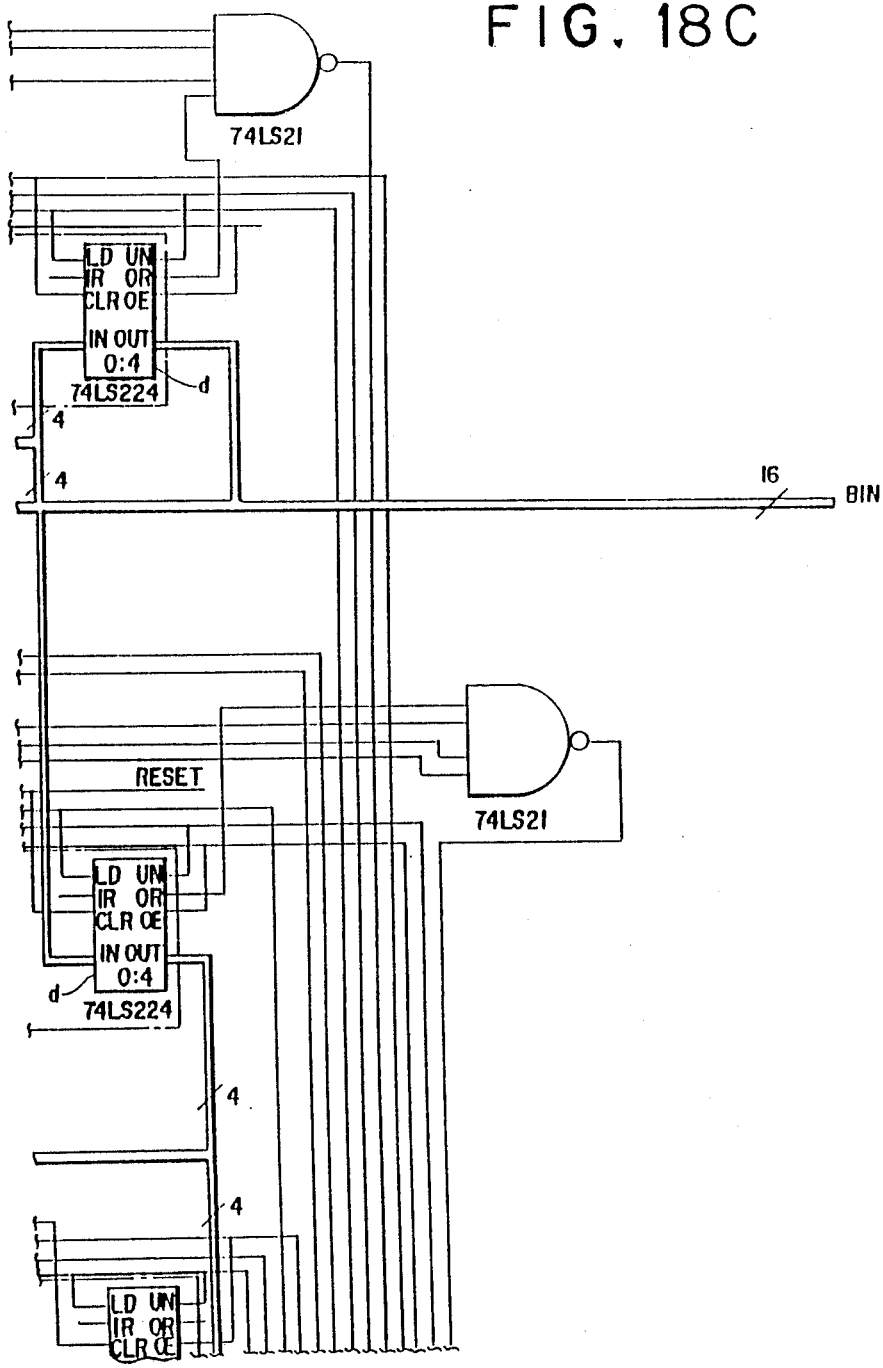
Figure 18D:
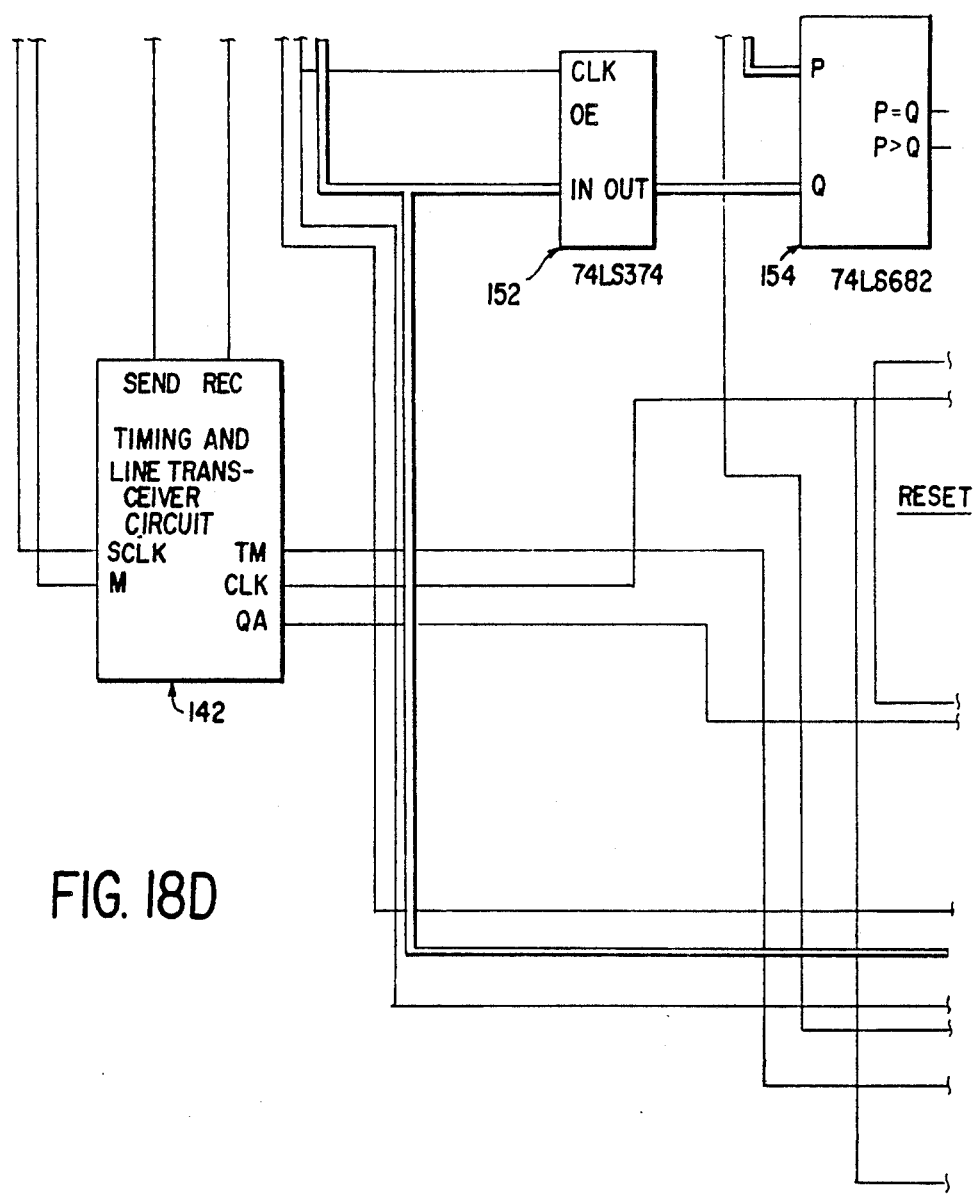
Figure 18E:
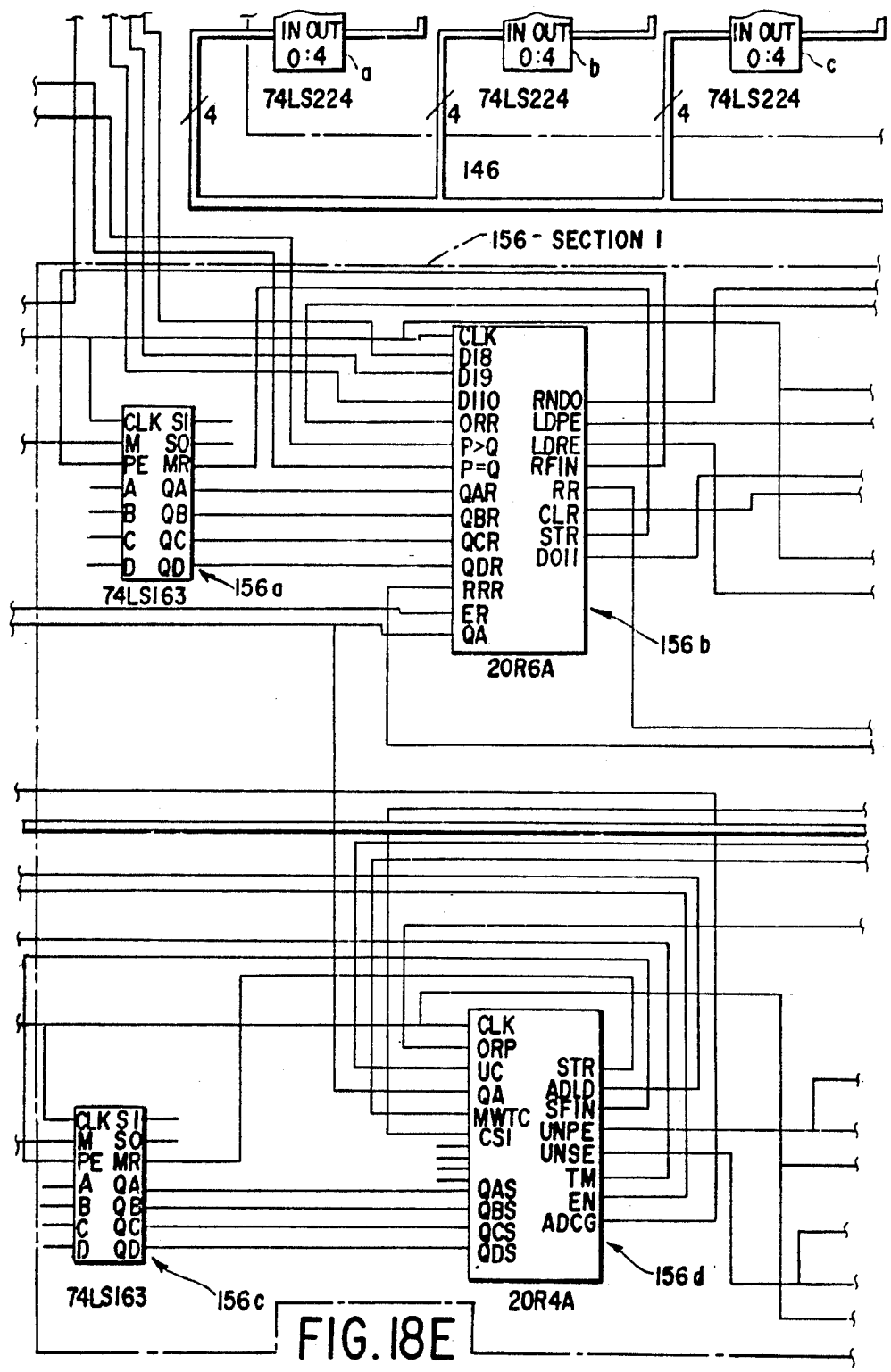
Figure 18F:
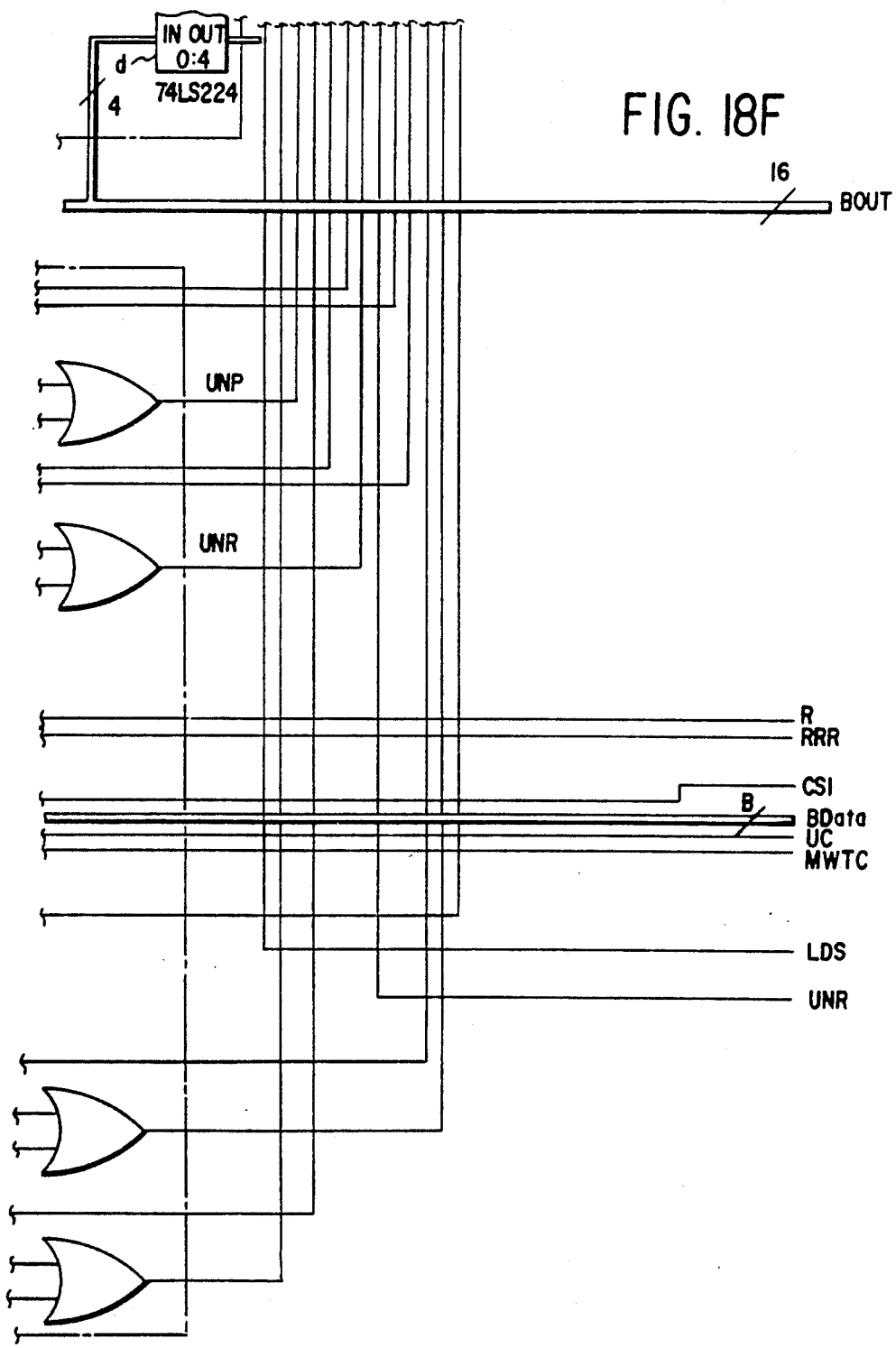
Figure 19A:
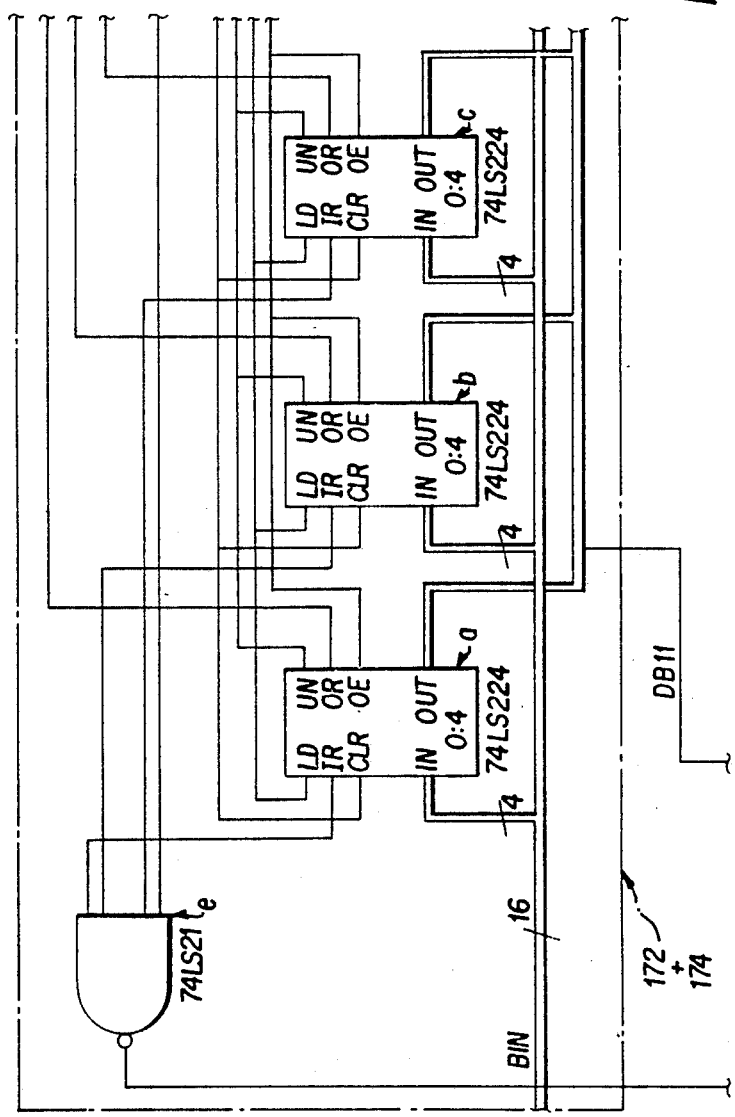
FIGS. 19 A-F are a circuit diagram of the packet decode circuit of FIG. 8 and 9.
Figure 19C:
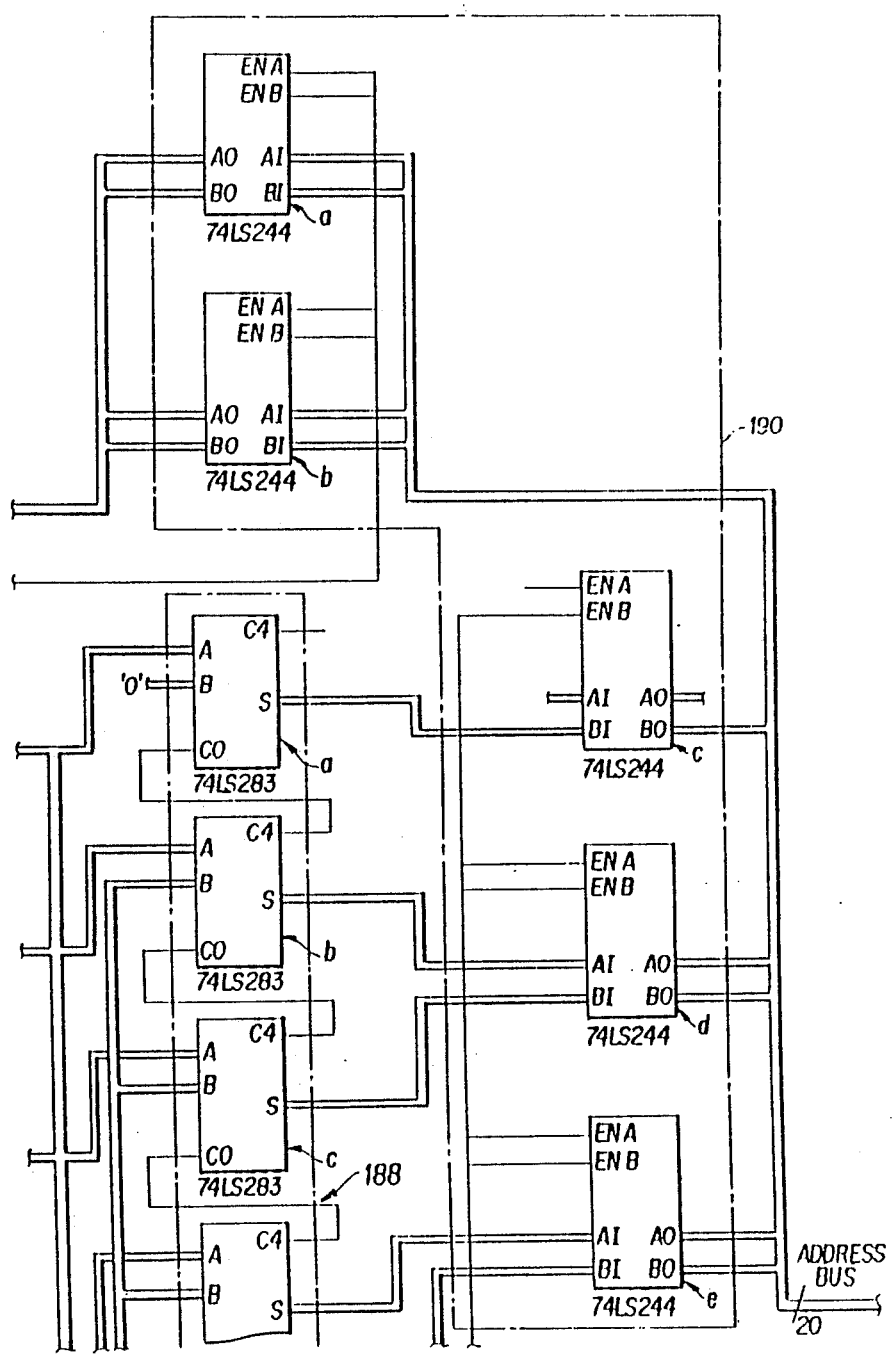
Figure 19D:
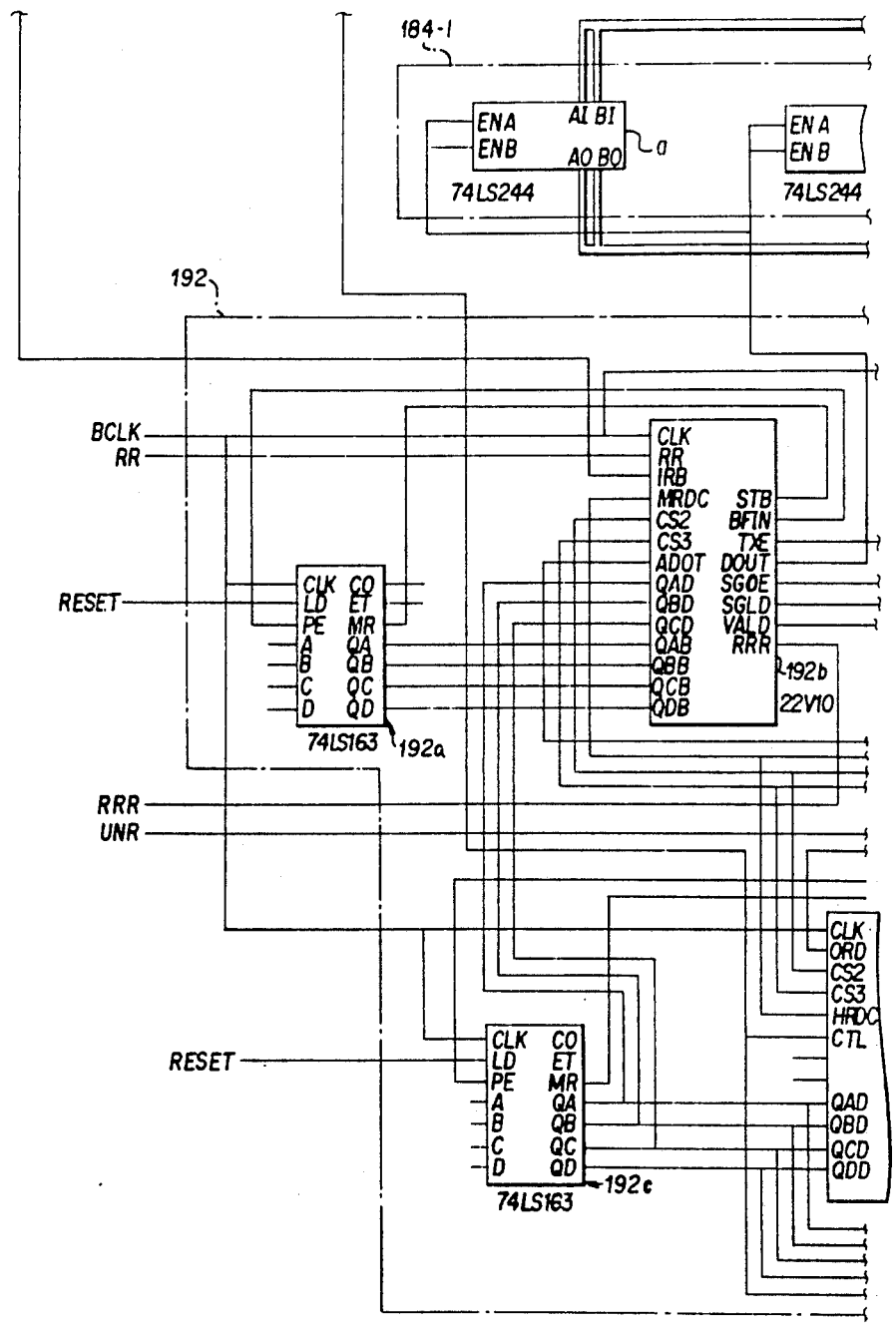
Figure 19E:
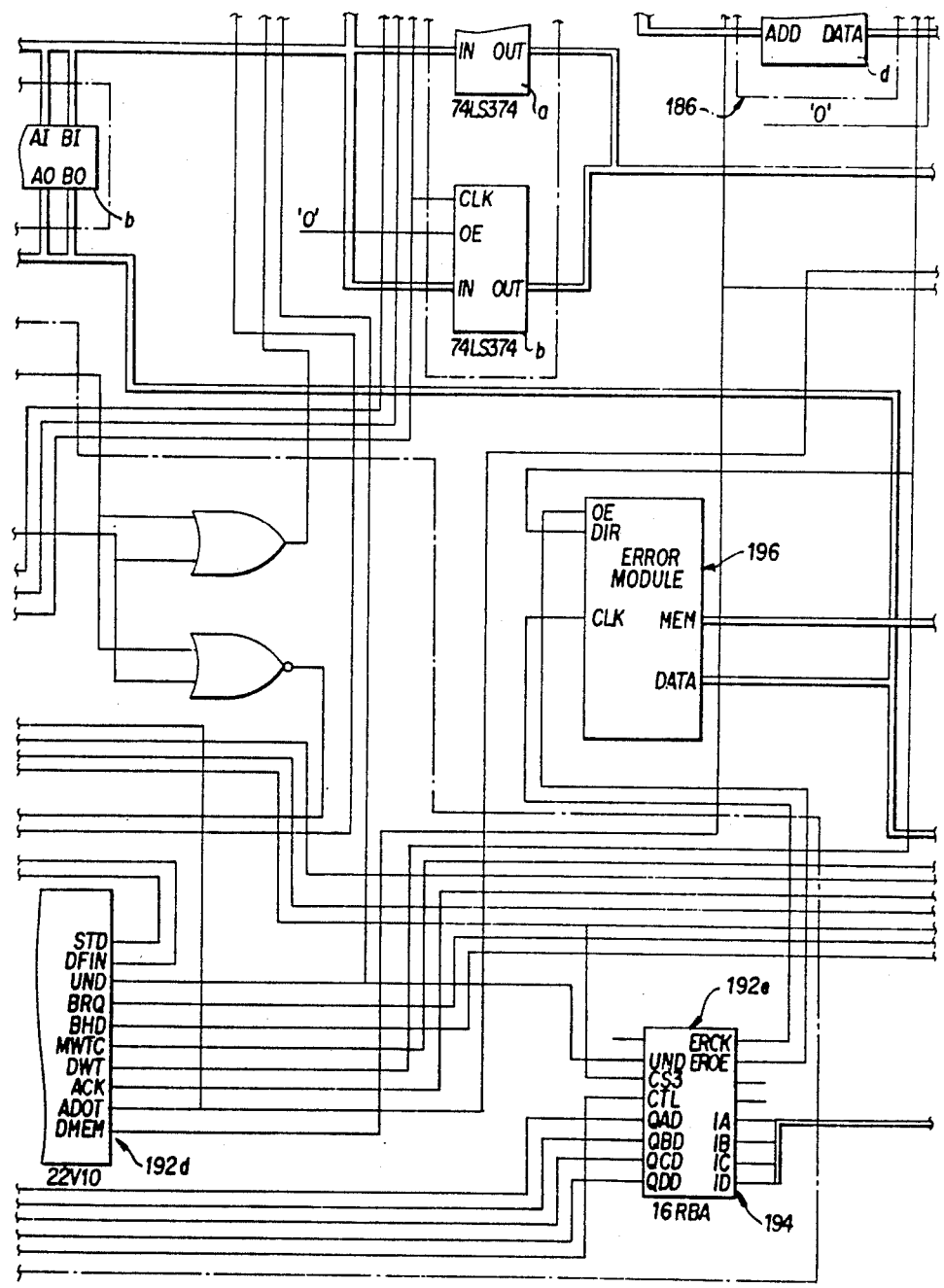
Figure 19F:
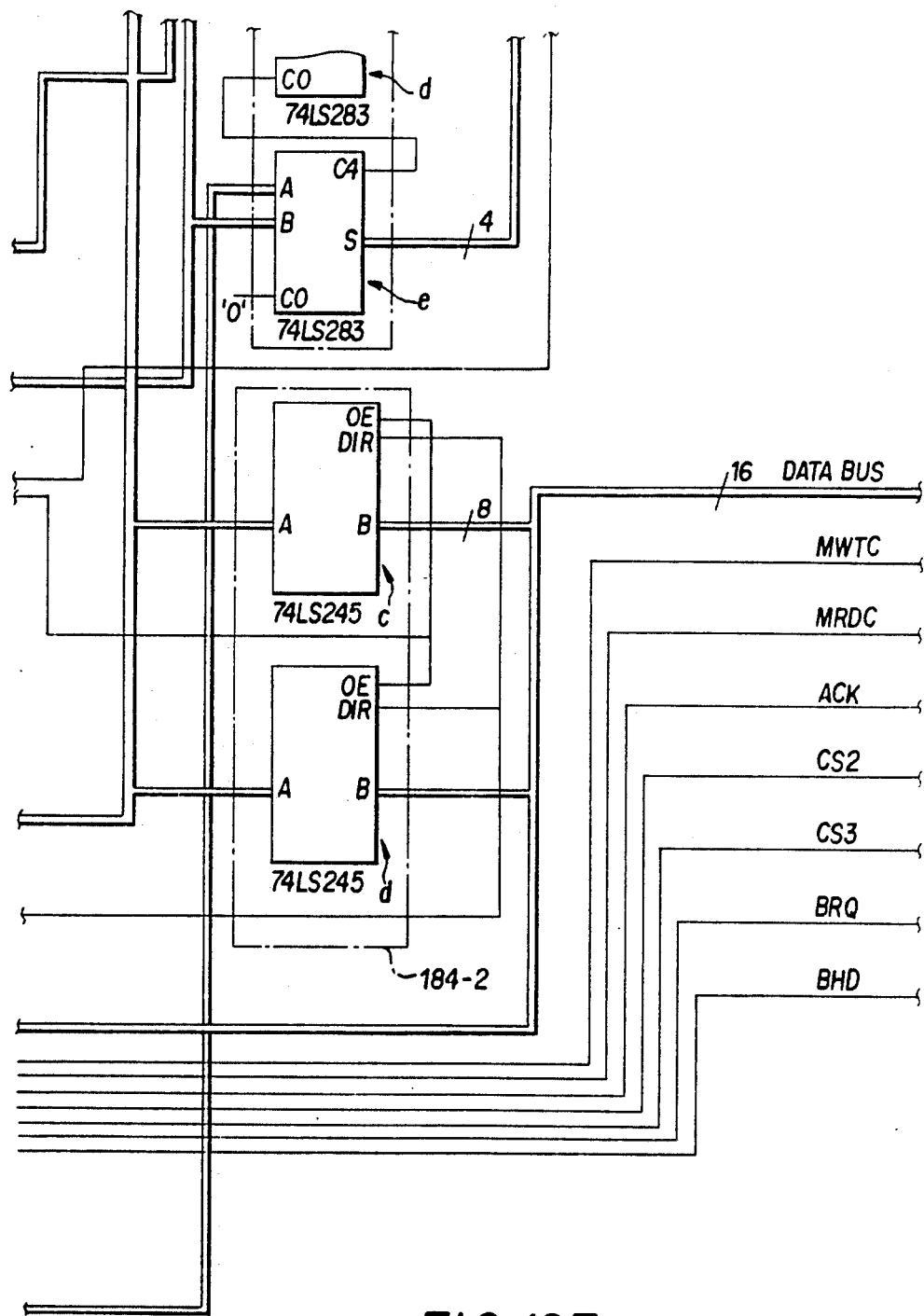
Figure 20A:
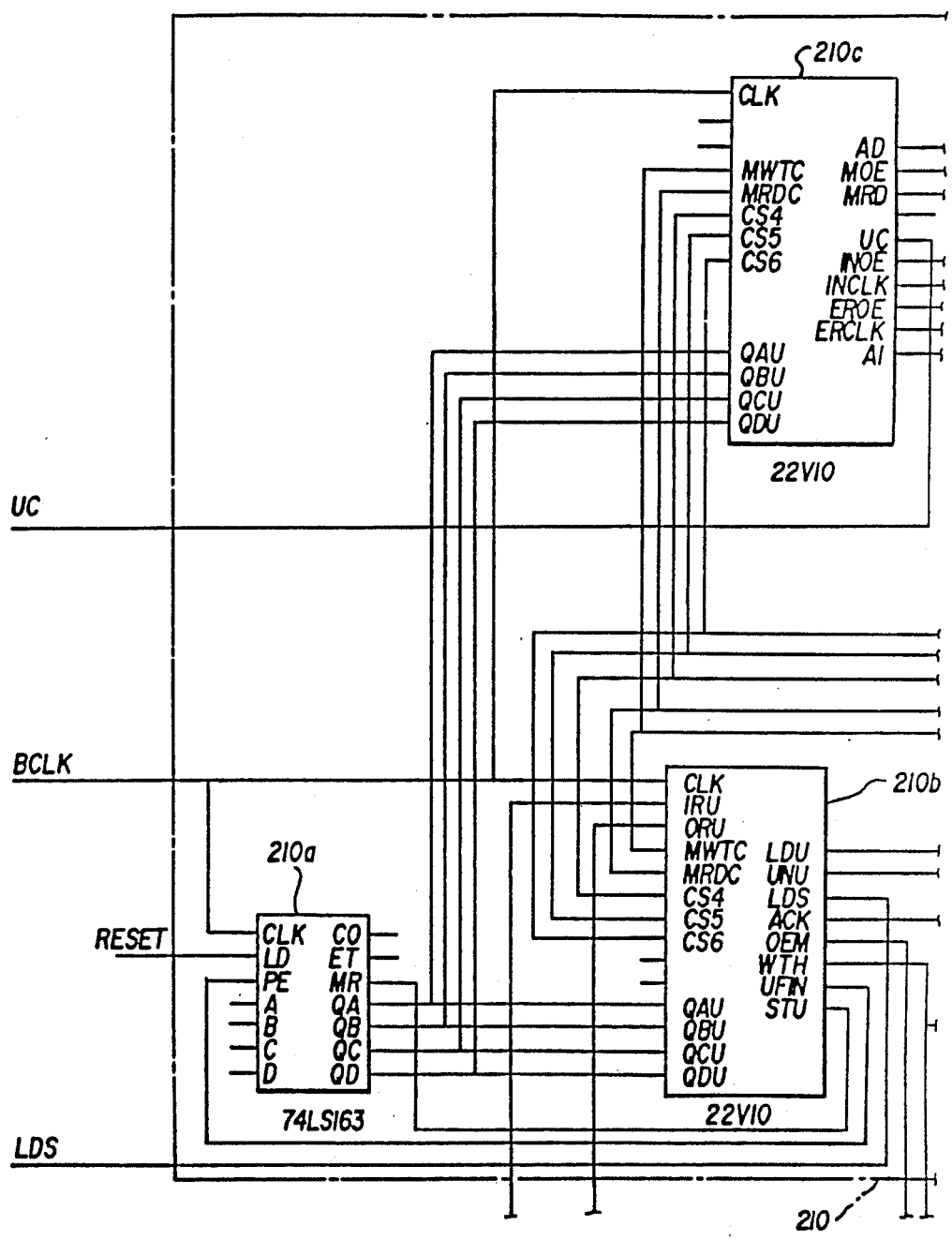
Figure 20C:
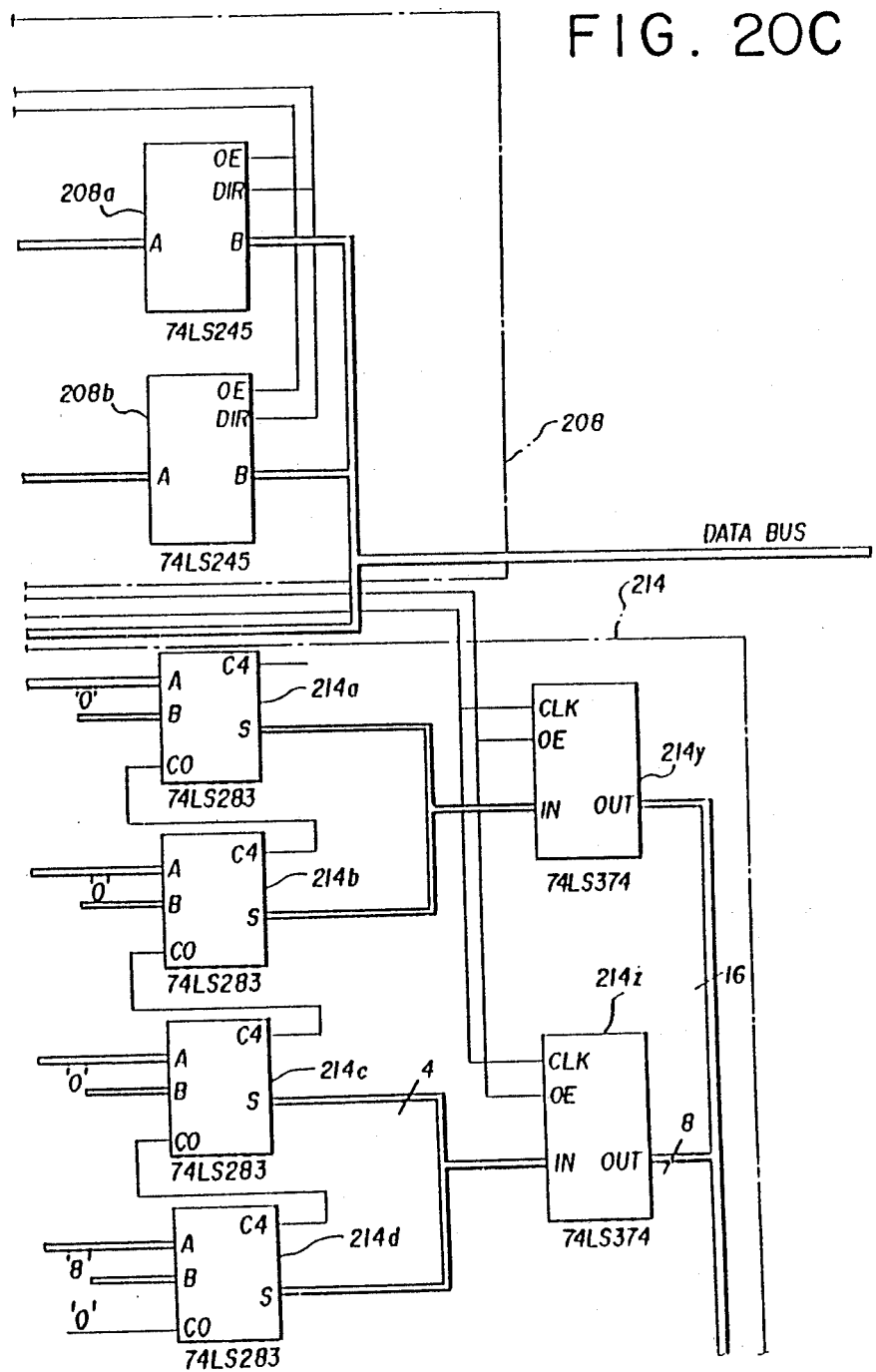
Figure 20D:
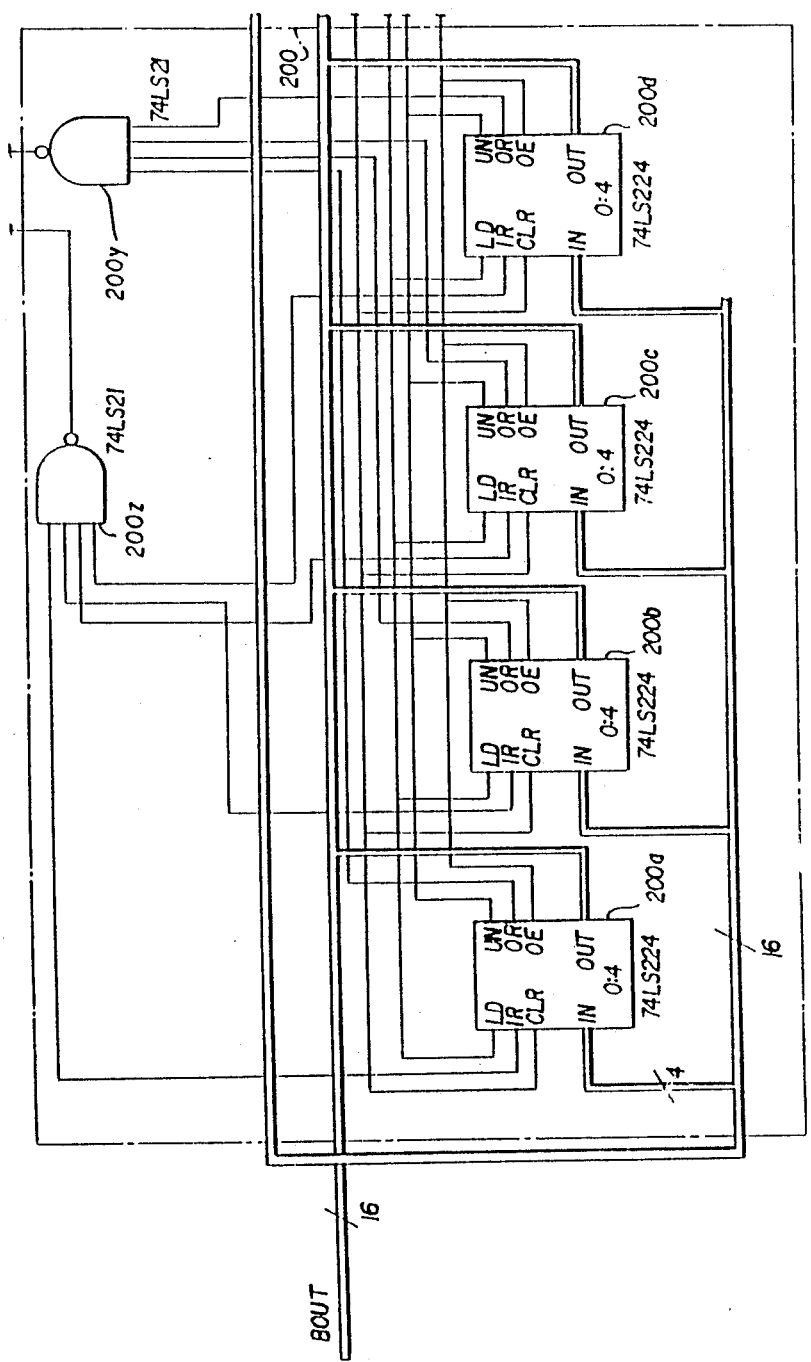
Figure 20E:
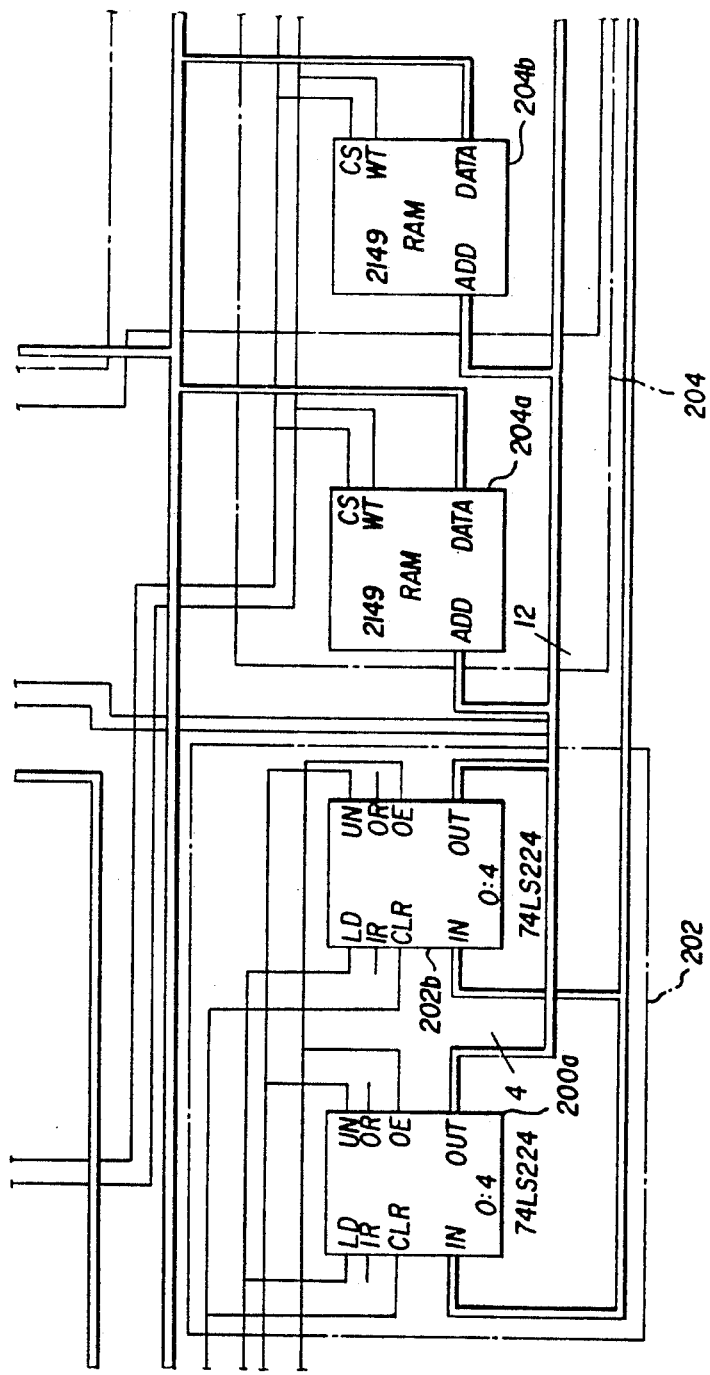
Figure 20F:
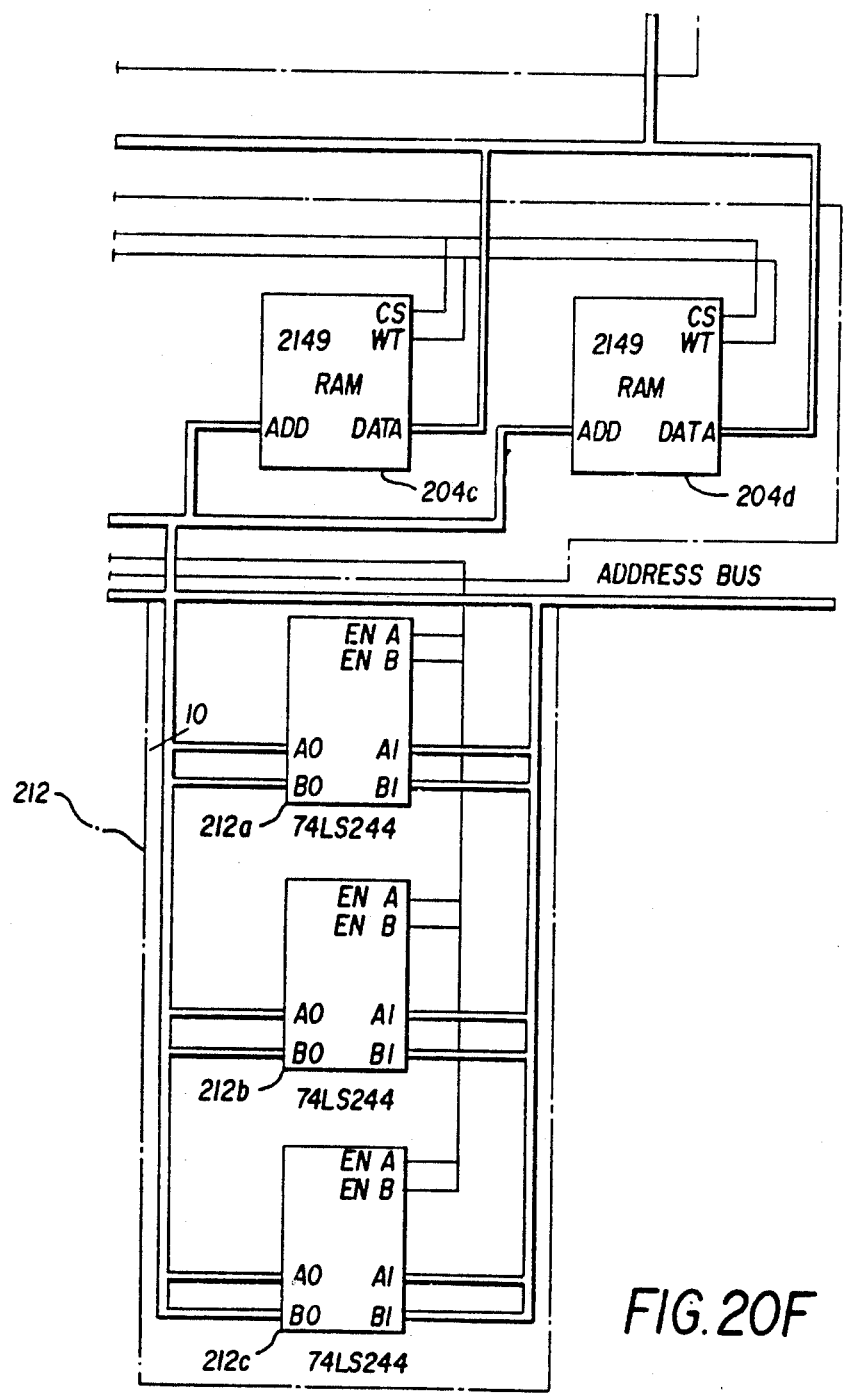
Figure 21A:
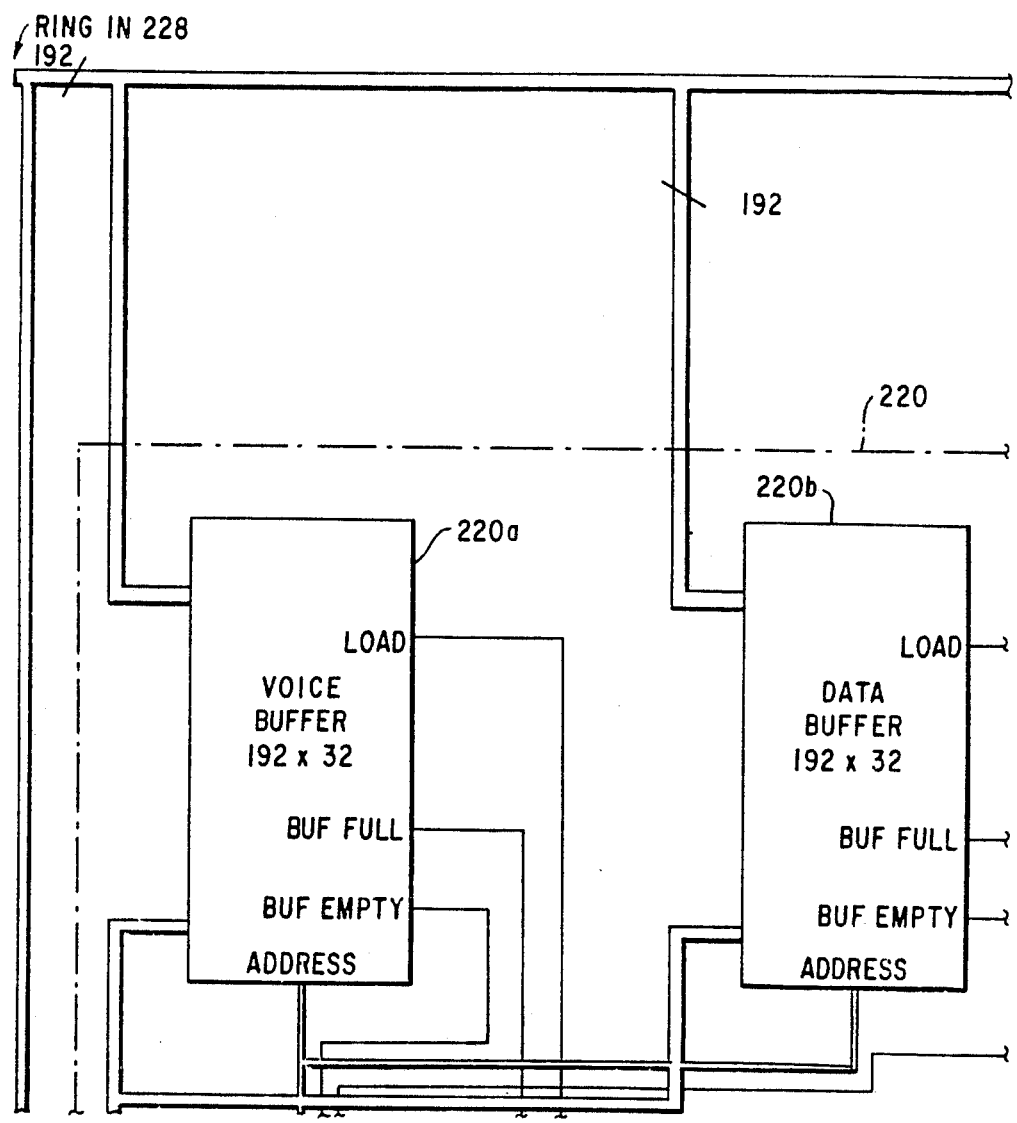
FIGS. 21A-F are a circuit diagram of the communications exchange unit of FIG. 11.
Figure 21B:
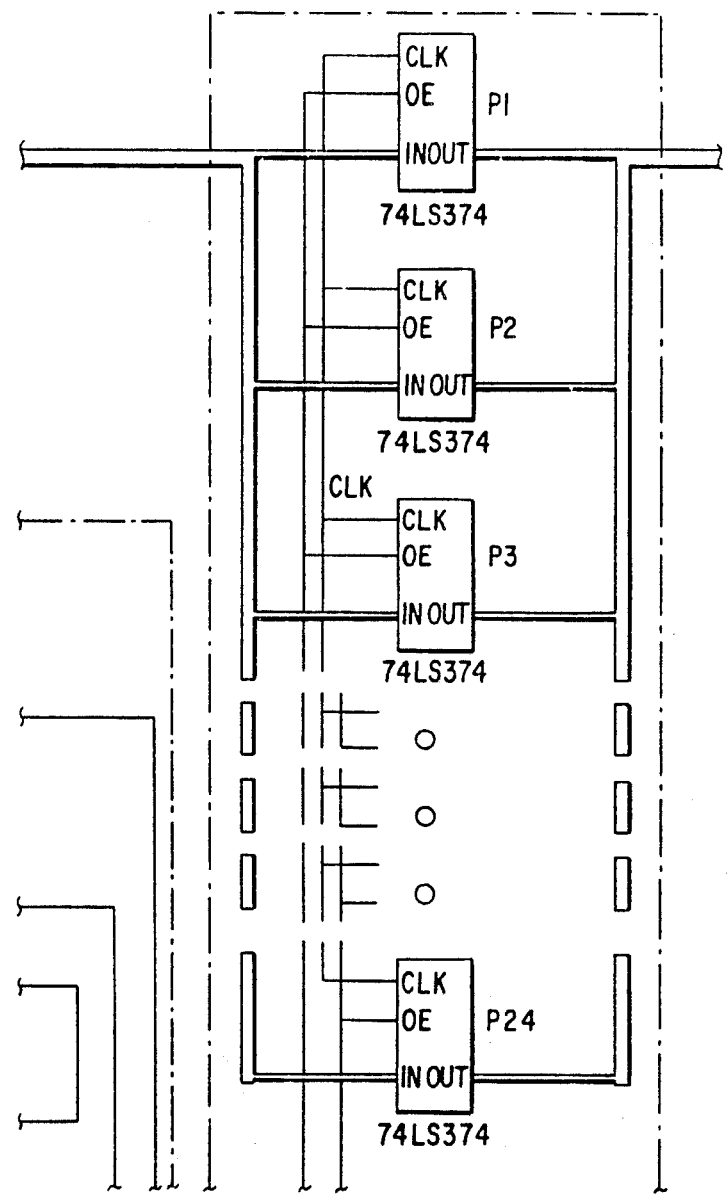
Figure 21C:
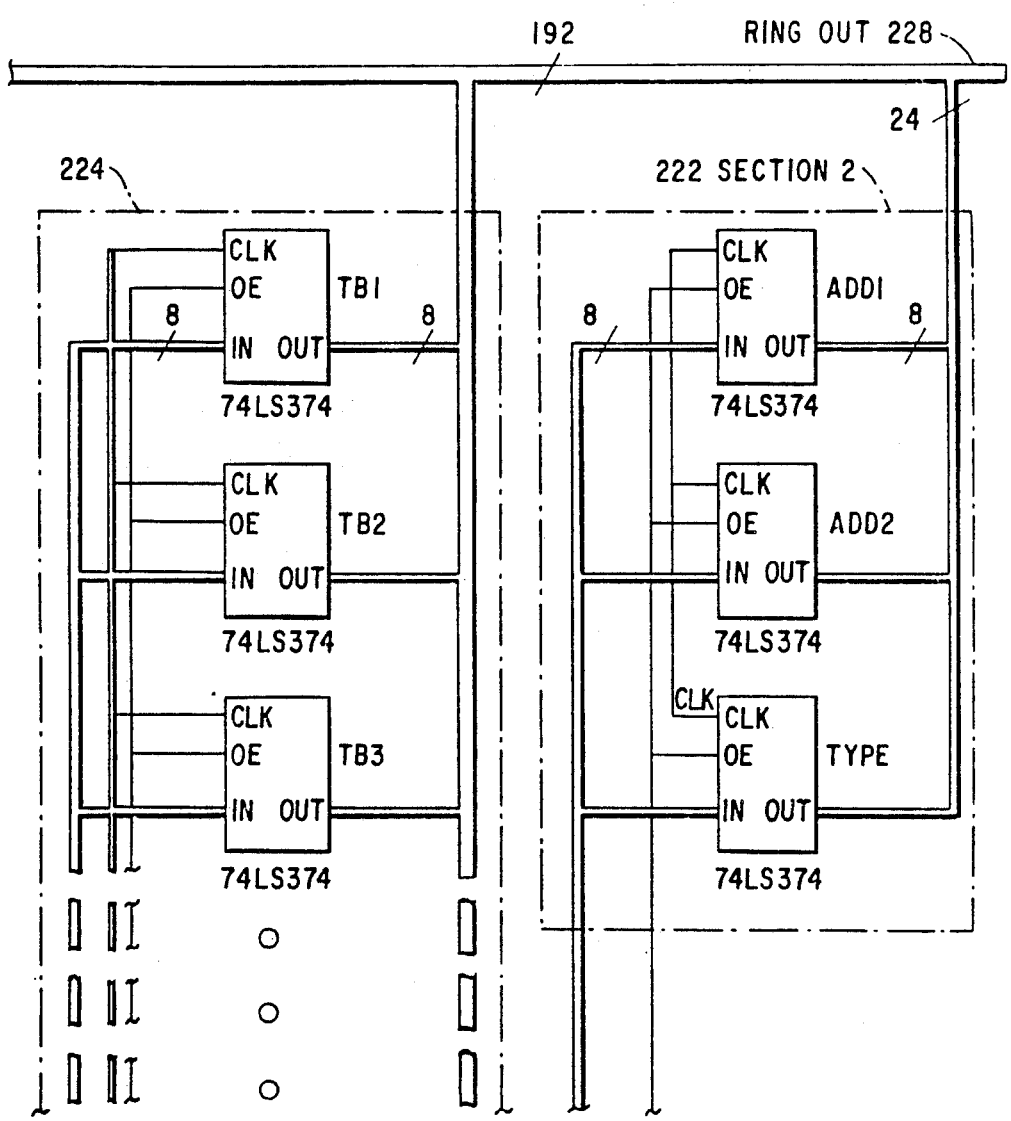
Figure 21D:
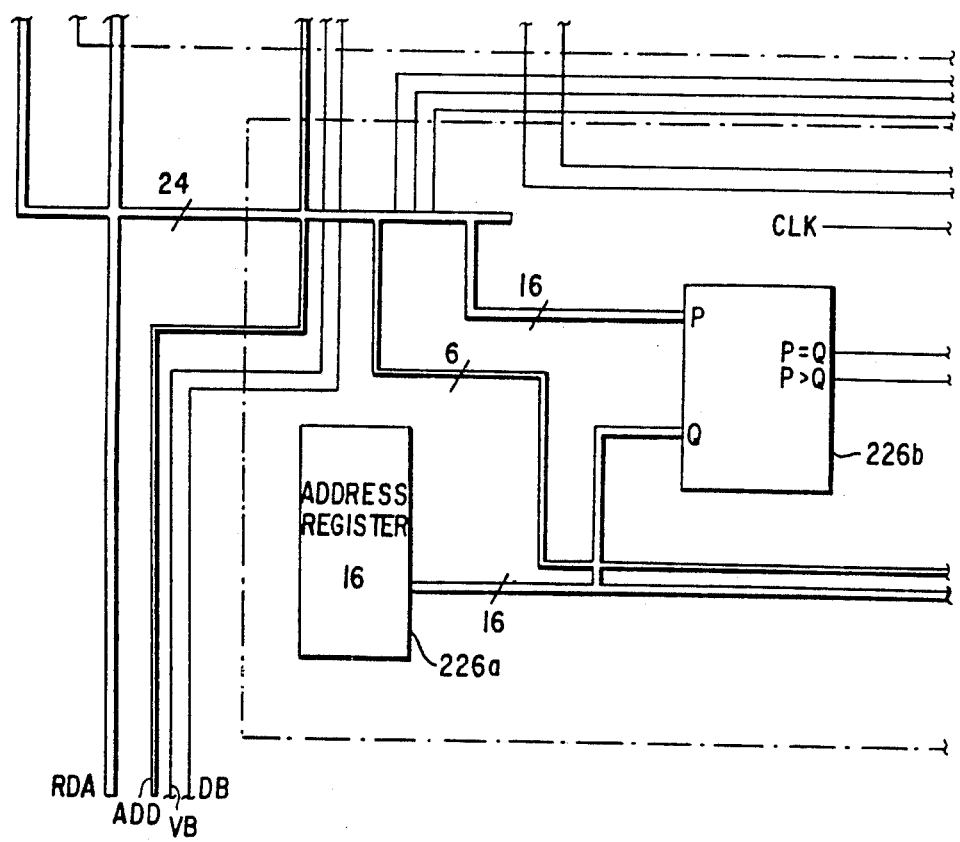
Figure 21E:
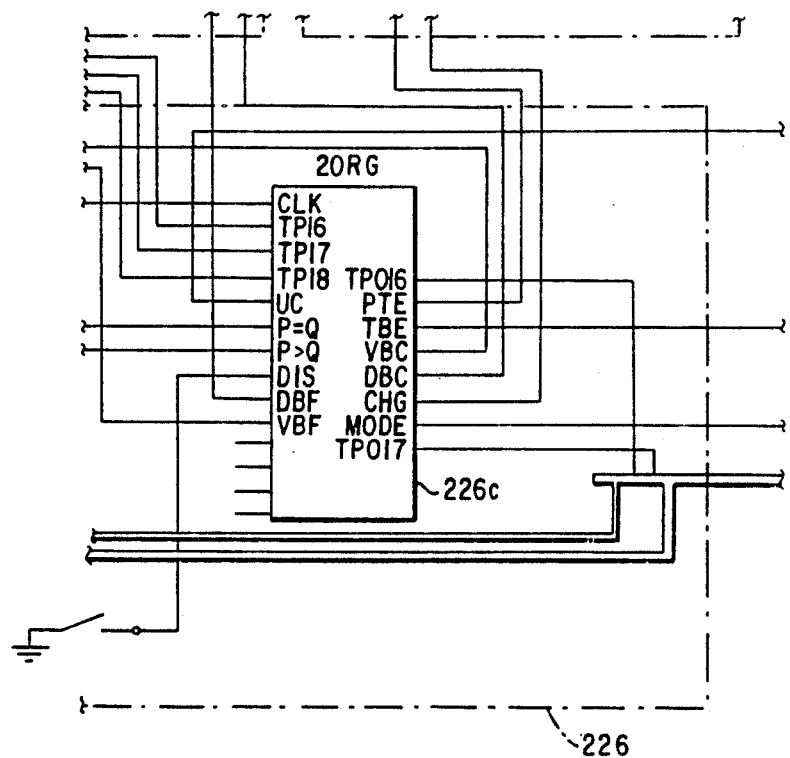
Figure 21F:
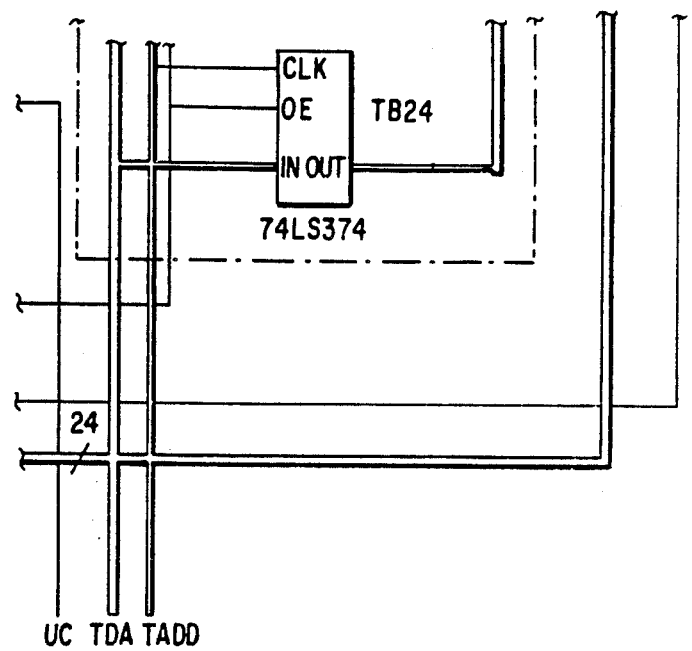

FIGS. 18A-F are circuit schematics of some of the block diagrams of FIGS. 6 and 7 and FIGS. 19A-F, 20A-F and 21A-F are circuit diagrams of other figures. The sheets of each of these figures are assembled as shown in FIG. 17. The blocks of the block diagrams are indicated on the circuit schematics by dashed lines. Individual, commercial 7400 series ICs are labeled with the block number followed by a letter when there is more than one IC to a block. Control line labels shown in these schematics are keyed to Intel i86 microprocessor system.

The schematic of FIGS. 18A-F depict details of input register 130, output register 132, pass through buffer 134, ring transmit buffer 144, and ring receive buffer 146. The schematic also depicts details of sequence and command logic 156 which is shown to comprise counters 156a, 156c, programmable array logics (PALs) 156b, 156d, address register 156e and tri-state buffer 156f. Timing and line driver and receiver circuitry 142, and error modules 138 and 140 are not shown in detail because their design is common art. Input register 130 is a 74F675 16 bit shift register which is clocked such that the packet is received from ring 30 as a succession of sixteen bit words. Thus, in the case of a 192 bit packet, twelve successive sixteen bit words are shifted through register 130. The first word causes the counter 156a to begin counting the twelve words of the packet. The first byte of the first word is also arithmetically compared in comparator 154 with the contents of the endpoint address register 152 which produces signals P Q and P=Q. At the same time, three type bits from the second byte are checked for their state, two of these bits specify the type (data, command or voice/data) of the packet and the other is the RND bit. Control logic contained in PALs 156b and d control the action of the receive, pass through, and transmit buffers 144, 134, 146. The control logic programmed in the PAL is a straight forward implementation of the rules of operation for the switch. In the prior art, software programs supplied with PAL devices readily convert boolean equations into the binary program necessary to program the device. The boolean equations describe the relationship between the inputs to the PAL and the desired outputs. The programming of these PALs is similar to the logic shown in Table I below and is a straight forward implementation of the rules of operation explained for FIGS. 6 and 7.

Receive, pass through, and transmit buffers 144, 134, 146 are each made up of four 4-bit wide, 16-bit deep 74LS224 asynchronous First-In First-Out (FIFO) memories. These FIFOs buffer and hold the twelve 16-bit words that make up a packet. Counters 156a and 156c sequence the words as the proper receive action proceeds as dictated by the control logic. Should error module 138 indicate that a packet was received in error, control logic clears the received packet by issuing a clr command to receive FIFOs 144a-d. Address register 156e. and tri-state buffer 156f permit an eight-bit address to be inserted into the address field of the message packet via FIFOs 134a,b. Cortrol PAL 156b issues directly the changed RND bit RNDO. Loading of the transmit FIFO 146 and the state of control signal UC into output register 132 is controlled by the circuit of FIG. 10. Unloading of the Receive FIFO 144 and the state of control signal RRR is controlled by the circuit of FIG. 9.

Figure 9:
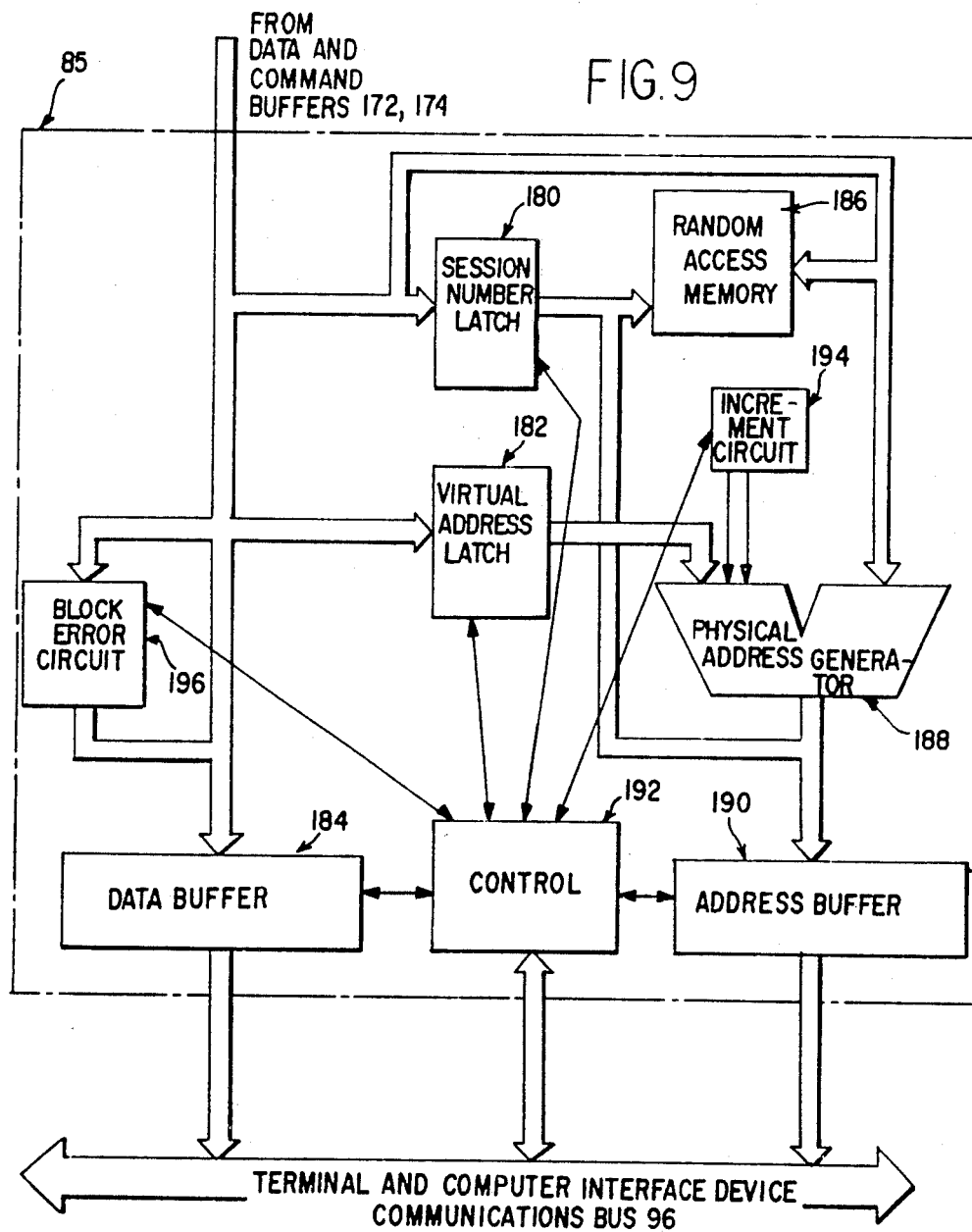
FIG. 9 is a block diagram of a packet decode circuit within the transmitter/receiver section of an endpoint.

FIG. 9 is a block diagram of packet decode circuit 85. The circuit comprises a session number latch 180, a virtual address latch 182, a data buffer 184, a random access memory (RAM) 186, a physical address generator 188, an address buffer 190, and a control circuit 192. It also comprises an increment circuit 194 and a block error circuit 196. Further details of this circuit are disclosed in FIGS. 19A-F discussed below. The decoding involves using the session number 125 to decode RAM 186 which provides to the physical address generator 188 a segment address word stored in a table RAM. The segment address word is then algebraically added to the virtual memory address field 126 of the packet and the sum generated by the physical address generator is a physical address. This address is presented to the memory of the using device or to the terminal and computer interface device. The address is incremented automatically by the increment circuit 194 as each word of data is placed in memory. Data placed in the memory of the terminal or computer interface device in this manner are later passed to the using device after proper commands have been received and possible conversion of the data to another format. Messages in the command buffer 172 cause an interrupt to occur in the terminal or computer interface device processor which then reads and interprets the command information.

A second type of error checking is performed for data packets by the block error check circuit 196. Error checking is performed on a session basis using only the data and memory address fields 123, 126 of the packets for each packet in a particular session. At the appropriate time the contents of the register are compared by the processor with an error code sent by the transmitting endpoint to verify whether the entire data buffer was sent without error. This type of error check is only performed for data transfers. If an error is detected at this point the entire data buffer sent since the previous block error check must be retransmitted.

FIGS. 19A-F are a circuit schematic of the block diagrams shown in FIGS. 8 and 9. The schematic depicts details of integrated command and data buffers 172, 174, session number latch 180, virtual address latch 182, data buffer 184, random access memory 186, physical address generator 188, address buffer 190, control logic 192, and increment circuit 194. Control logic 192 is further shown to comprise counters 192a,c and PALs 192b,d. Block error circuit 196 is not shown in detail as its construction is common art.

Packet disassembly action is initiated when an active RR signal (FIG. 18F) is received from the ring access circuit. Control logic existing in control PAL 192b then initiates counting in counter 192a. If the control signal DB11 is active, the control logicinitiates no action until the processor 92 of FIG. 4 reads the data buffer by performing twelve consecutive memory read cycles. In this case the control logic takes each consecutive packet word from the receive buffers 172, 174 and presents the signals to the data buffer 184 after each read cycle.

If control signal DB11 is not active, then the control logic performs the following actions. The sixteen bits of the first word of the message packet are discarded; the second byte of the message packet is clocked into session number register 180, and the sixteen bits of the third word of the message packet are clocked into virtual address register 182. The enabled output of the session number register is decoded by random access memory 186 which outputs a segment address word from a table of such words. The table is maintained by terminal and computer interface device 90 which can write values into RAM via address buffers 190a,b and data buffers 184c,d. Segment address word is arithmetically added to the virtual memory address stored in register 182 by 4-bit adders 188a-e of physical address generator 188 and is presented to tri-state buffers 190c-e of address buffer 190.

Control logic issues bus control signals MWTC, BRQ, and BHD (FIG. 19F) to gain command of communications bus 96. These control signals are issued according to the common art. Once the system bus is obtained, the fourth through eleventh words of the packet are presented to the data bus through tri-state buffers 184a,b of data buffer 184 for transmission via bus 96 to random access memory 94 of FIG. 4. The address on the address bus is incremented by one for each packet word by increment circuit 194. After the words are written into random access memory 94, the twelfth word of the packet is discarded and the cycle is at an end.

Block error checking occurs during the above packet disassembly process in the following manner. During the same cycle that the virtual address is clocked into the virtual address register, random access memory 186 is decoded by the contents of the session number register to provide the running error code. This code is clocked into error module 196 via the MEM input at the beginning of the next cycle. On each consecutive cycle, packet words are presented to the error module via the data input. On the last cycle during reception of the twelfth word of the packet, error module 196 outputs the new running error code which is reloaded into random access memory 186.

Other commands of common art which the control logic performs consist of reading and writing to random access memory from the system bus. The programming of the control logic is a straight forward implementation of the operations given in this description.

FIG. 10 shows a block diagram of the packet assembler 87 of transmitter/receiver unit 80. The circuit comprises an output message buffer 200, a session number buffer 202, a packet framing memory 204, a DMA address generation circuit 206, a data buffer 208, a control circuit 210, an address buffer 212, an increment register 214 and a block error generator 216. Further details of this circuit are disclosed in FIGS. 20A-F discussed below. Digitized voice or video messages originating within the endpoint using device are passed via output data buffer 208 to the packet assembler. The packet assembler adds the address and type fields and may add session and virtual memory address detection and correction fields to the message to form a packet. The address and type fields (and session and virtual memory address fields, if any) are stored in a table in packet framing memory 204. This table is loaded into memory 204 from terminal and computer interface device in advance.

To access the information in packeting framing memory 204 eight bits of address information are provided via address buffer 212 to session number buffer 202. These are used to decode type and session number information from packet framing memory 204. For the transmission of digitized information, control logic 210 then takes address, type and session number fields from the packet framing memory 204 and places these fields in the output message buffer 88 of FIG. 6. After these overhead fields are in the transmit buffer, a fixed amount of digitized information is forwarded from the output message buffer 200 to the transmit buffer creating a packet without an error field. When signaled by the ring access logic, the packet is placed on the serial or parallel bus by the transmitter and the error field is appended by error code generator 140 (FIG. 6). Some endpoints may have more than one type of using device and may therefore have more than one output data buffer.

In the case of data transmission, data transmitted by the using device is typically received by the terminal and computer interface device through communications device 98 and the data is stored in memory 94. The terminal and computer interface device may operate at this time to convert the data in its memory to a different format. At the appropriate time the terminal and computer interface device signals direct memory access (DMA) circuit 206 that a buffer transfer should take place. DMA circuit 206 then removes that data from the memory of the terminal and computer interface device and transfers the data at a predetermined rate to the data buffer 208 where it is prepared for transmission. It does this in the conventional way according to the state of the art, by placing the address of the data to be fetched on the address portion of Ommunications bus 96 along with a memory read signal at predetermined intervals. As a result the rate of packet information for any individual session is controlled by the rate of address generation by the DMA circuit 206. When the memory of the terminal and computer interface device places the data onto the memory bus, it is read by the data buffer 208. The DMA circuit then proceeds to read a set number of data into the data buffer at a predetermined rate. This action obviates the need for software flow control protocols otherwise necessary in the endpoints because the data flow is determined by the setting the DMA rate. In some cases data may not be placed in the memory of the terminal and computer interface device but instead may be directly transferred from the memory of the using device to the data buffer for transmission.

Preparation for data transmission involves the addition of overhead fields to sections of the data to be transmitted as in the case of digitized information. However, data transmission also requires the use of a virtual memory address field 126 which must be incremented after each packet sent. This is done by the increment register 214. In the preferred method, for each packet, 48 bits of overhead information representing the address, type, session number, and virtual memory address of the message data are first transferred to the transmit buffer. Then, 128 bits of data are transferred representing 16 bytes. After this occurs, an incremented virtual memory address value is stored in the packet framing memory. Finally, 16 bits of error control are appended to the end of the packet as the packet leaves output buffer 146 (FIG. 6) by the error code generator 140 (FIG. 6).

Overhead fields must be stored in the packet framing memory by session number before any data is transmitted. This is done for data packets as well as for control and digitized voice packets. In the case of control and digitized voice packets, messages are presented to the transmit buffer directly by the processor or voice transceiver, respectively, through the output data buffer 208 and the DMA circuit is not utilized.

FIGS. 20A-F are a circuit schematic of the block diagrams shown in FIG. 10. The schematic depicts details of output message buffer 200, session number buffer 202, packet framing memory 204, data buffer 208, control logic 210, address buffer 212, increment register 214, and block error generator 216. Output message buffer 200 comprise four 4-bit wide, 16-bit deep 74LS224 asynchronous FIFO memories 200a,b,c,d and session number buffer 202 comprises two 4-bit wide, 16-bit deep 74LS224 FIFO memories 202a,b. Packet framing memory compriss four 2149 random access memory chips 204a,b,c,d. Control logic 210 comprises counter 210a and PALs 210b,c. Address buffer 212 comprises three tri-state buffers 212a,b,c.

Packet assembly is initiated when the processor 92 of FIG. 4 or a conventional Direct Memory Access (IA) circuit issues commands MWTC and CS4 (FIG. 20B). Control logic then clocks data from the data bus into the output message FIFO 200a-d. Control logic simultaneously clocks the lowest 8 bits present on the address bus into session number FIFOs 202a-b. The contents of the session number FIFOs and control signals A0 and A1 from PAL 210c are used to decode packet framing random access memory 204. Signals A0 and A1 are incremented as three consecutive 16-bit words are read from memory 204 and clocked by the LDS signal into ring output transmit buffer 88 of FIG. 6 via the BOUT data bus. A fourth word, the running error code, is read from memory 204 and is clocked into the error module 216. Eight data words are then clocked out of the output message buffer 200 (as they become available) and are clocked into transmit buffer 88 as described earlier. Finally, the new running error code is taken from the error module and is replaced in memory 204 at the same location from which it was originally read. From there it is provided via the BOUT data bus to ring transmit buffer 146. The incremental value of the virtual memory address is also taken from register 214 and replaced in packet framing memory.

Standard operations which the control logic performs consists of reading and writing to random access memory from the system bus. The programming of the control logic is a straight forward implementation of the procedure specified in the foregoing description.

Figure 11:
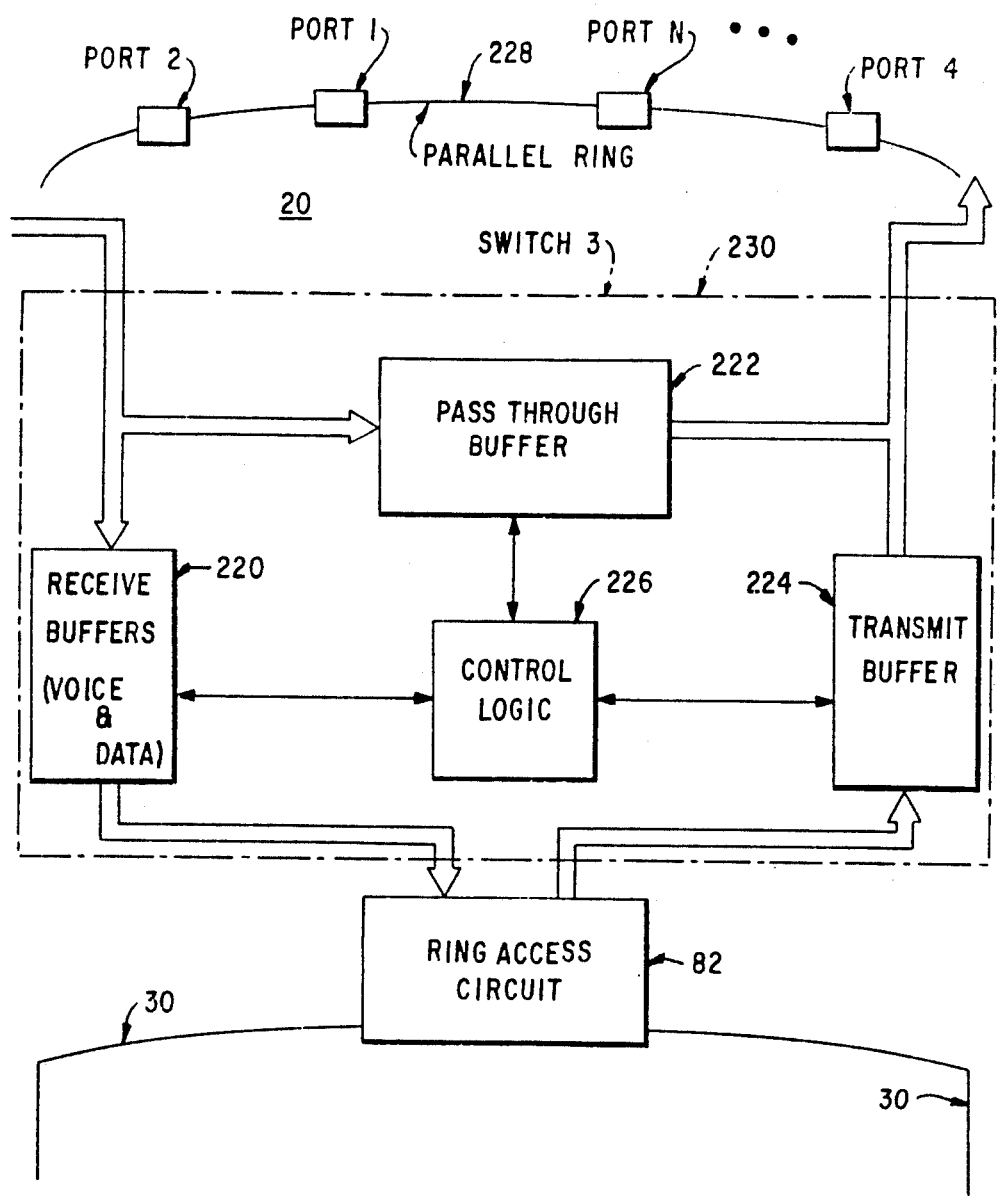
FIG. 11 is a block diagram of a communications exchange unit with a detailed block diagram of a switch and a port in the communications exchange.

Single rings made up of a ring 30 and endpoints 40 such as described in FIGS. 2-10 can be used to interconnect a plurality of using devices. The rings, and endpoints may operate on serial data or data that is parallel or partially parallel. Advantageously, endpoints on different rings are interconnected by one or more communications exchange units. Communications exchange units 20 work by utilizing the ring acess circuits of FIG. 6 in parallel or partially parallel configuration. FIG. 11 is a block diagram of an N-port communications exchange unit 20. As shown, the comxunications exchange unit is a ring with a plurality of ports or switches connected thereto. Each port of the unit comprises receive buffer 220, pass through buffer 222, transmit buffer 224, control logic 226 and a ring access circuit 82 identical to that shown in FIG. 6. These elements are shown for port 3 of the communications exchange and will be understood to be present at every other port. The N ports that constitute the communications exchange unit are interconnected by a ring 228 that provides for transmission of data in parallel or partially parallel format. For example, for a 192 bit message packet, ring 228 may be 192 bits wide or any submultiple of 192. Each port operates in the same manner as the serial ring access circuit 82 of FIG. 6 but does not require the input and output registers 130, 132. Ring access circuit 82 of FIG. 11 operates in the same fashion as ring access circuit 82 of FIG. 6 to send and receive serial message packets on ring 30. In FIG. 11, however, circuit 82 receives parallel data from receive buffers 220 (instead of transmit buffers 88 of FIG. 6) and provides parallel data to transmit buffer 224 (instead of receiver buffer 84 of FIG. 6).

Communications exchange units may recognize multiple addresses within specified programmable ranges as set in address registers in control logic 226. In general, communications exchange units recognize higher levels of address than do endpoints but are able to do this quickly because of the parallel nature of the switch. Messages with proper address and type fields are placed in the appropriate receive buffer 220 which comprises a digitized information buffer and a data buffer. Messages in the digitized information buffer are always given priority over messages in the data buffer for transmission out of the port. Each buffer is emptied by ring interface circuitry comprising serial ring access circuit 82. The buffers 220, 224 must be of a length which allows a speed conversion from the high speed parallel ring of the communications exchange unit to the lower speed of a serial or partially parallel ring connected to the port. The length required depends greatly on the statistics of the actual traffic occurring in the system but must typically be at least 25% of the ratio between the data rates of the high speed ring and the low speed port multiplied by the number of ports in the communications exchange. Receive buffers of 50 packets length are used in the preferred embodiment.

FIGS. 21A-F are a circuit schematic of the block diagram of FIG. 11. The schematic depicts details of receive buffers 220, pass through buffer 222, transmit buffer 224 and control logic 226. Control logic 226 comprises address register 226a, comparator 226b, and PAL 226c. Parallel ring 228 is illustratively 192 bits wide. Receive buffers comprising voice buffer 220a and data buffer 220b are 192 bits wide and 32 bits deep. They are not shown in detail because their design is conventional. The pass through buffer 222 is made up of 24 74LS374 octal D-type flip-flops P1-P24 arranged in a parallel format such that each wire in the input ring serves as the input to a D-type flip-flop. The pass through buffer also consists of three additional 74LS374 flip-flops labeled type, add1, and add2. Similarly, transmit buffer 224 is made up of 24 74LS374, D-type flip-flops arranged in a parallel format such that each wire in the output ring is connected to the output of a D-type flip-flop in both the transmit buffer and the pass through buffer. The 192 bit parallel input ring serves as an input to voice and data receive buffers 220a and 220b, comparator 220b, control logic 220c, and type register 222.

Switching proceeds as follows. On a low to high transition of the CLK signal, the signals of a new packet became available on the RING IN lines. The address portion of the packet appears in the first and third bytes of the packet which always appear on the same RING IN lines. The address bits are compared with the switch address contained in address register 226a by comparator 226b. Comparator 226b can be a pair of 74LS682 address comparators in the common art. Signals P=Q and P Q show the arithmetic relationship of the two addresses and these signals are made available to control logic contained in 2OR6 Programmable Array Logic (PAL) 226c. The PAL controls the action of the switch as described in detail in the description for FIGS. 6 and 11.

The equations for the PAL shown in FIG. 20 are set forth in Table I. In the equations, a "+" indicates a logical "OR" operation, "*" indicates a logical "and" operation, / indicates a logical "NOT" or inversion, and ":=" indicates a register output.

TABLE I

```
TPO16 = TP16
       + P=Q * /TP18 * DBF
/PTE :=  /UC
       + P Q
       + TP17
       + P=Q * /TP18 * DBF
/TBE := /DIS * UC * /P=Q * /P Q
        /DIS * UC P=Q * /TP17 * (TP18 + (/TP18 * /DBF))
VCB :=  /DIS * (P=Q + TP17) * TP18 * /VBF
DBC :=  /DIS * (P=Q + TP17) * /TP18 * /DBF
/CHG :=   P Q
        + TP17
        + DIS
/ADDE :=   /DIS * P=Q
         = /DIS * /P=Q * /P Q
TPO 17 = TP17
OUTPUTS ARE:
```

| TABLE I-continued |
| --- |
| TPO16, PTE, TBE, VBC, DBC, CHG, ADDE, TPO17; |

The operation of the PAL determines whether the packet is captured by the voice or data buffers, whether it is ignored, whether it is passed on through the pass through register, and whether a transmission is sent from the transmit buffer. The PAL logic operates such that one and only one of the two buffers 222, 224 is enabled onto the output ring. Add1 and Add2 of the pass through buffer contain the address of the port and will substitute this into a packet to effectively kill the packet when such action is appropriate.

Figure 12:
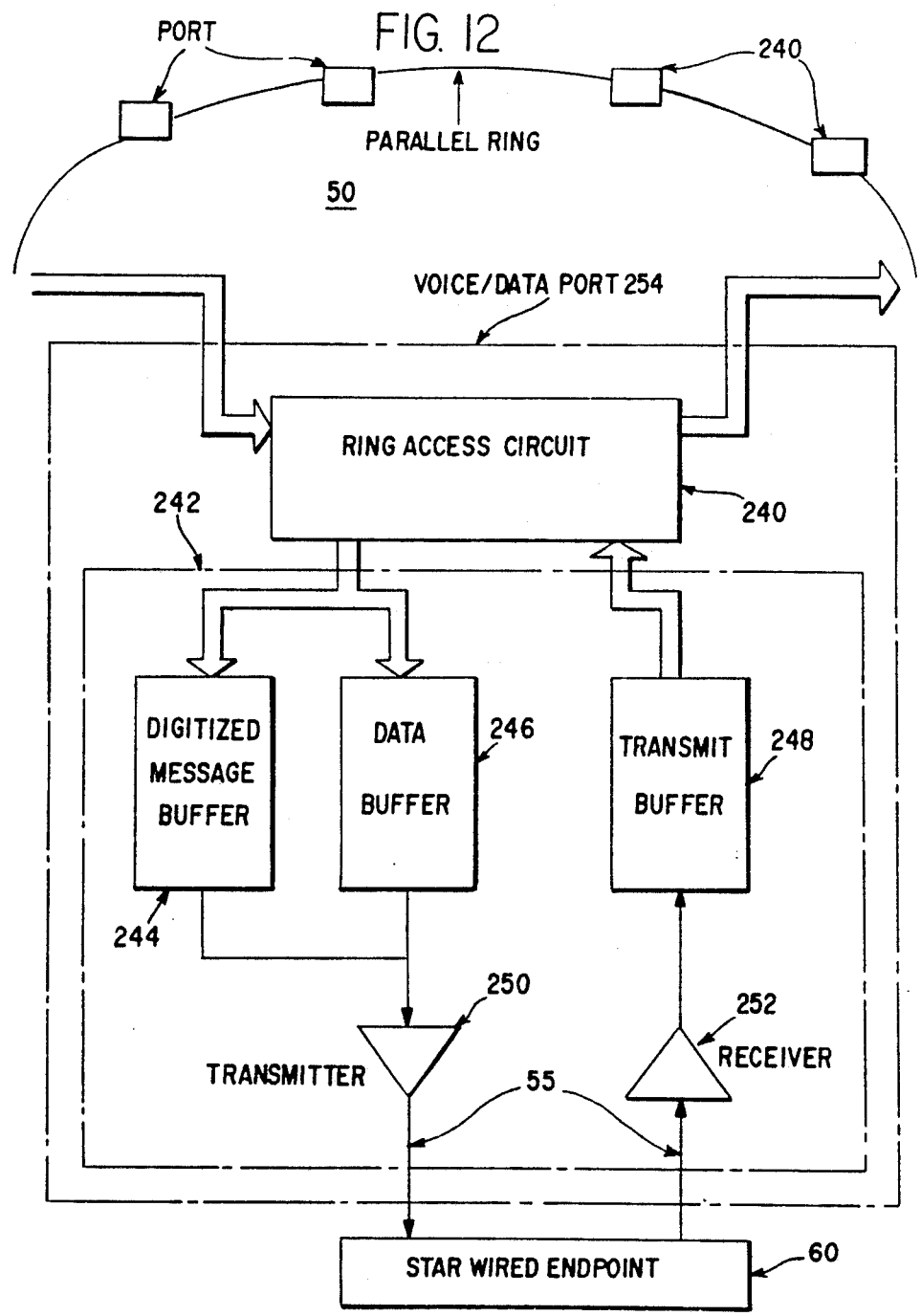
FIG. 12 is a block diagram showing a form of the present invention which allows star wiring of the network and allows voice and video communications, with a detailed diagram of a single switch and port.

Voice and video communications should not be provided on an extended serial ring because of the lack of proper timing information. For this application, the form of the invention is changed such that the entire ring with transmitter/receiver section and ring access logic is placed within a small enclosure called a voice data communications exchange. As shown in FIG. 12, voice/data communications exchange 50 comprises a plurality of ports connected by a parallel ring 230. Each port comprises a ring access circuit 240 and transmitter/receiver logic 242. The transmitter/receiver logic comprises a digitized message buffer 244, a data buffer 246, a transmit buffer 248, a transmitter 250 and a receiver 252. Communication to endpoints takes place through star wired serial lines 55 between transmitter/receiver logic 242 and endpoints 60 which may be terminal and computer interface devices and using devices. These endpoints are similar to ring endpoints except that ring access circuitry in the star connected endpoint 60 does not need to decode the address field since this is done within the voice/data communications exchange's ring access circuit. Other than decoding the address field the operation of the ring access circuits are the same.

Ring access circuit 240 is a partially parallel circuit typically eight bits wide but it may be greater or less. The operation of the ring access circuit is similar to that of the serial ring access circuit 82 contained in an endpoint as described by FIG. 6 except that receive and input and output shift registers 130, 132 are not used. Transmitter 250 and receiver 256 can be of various designs and protocols including time division multiplexing or HDLC. Some processing of the messages may take place in the voice/data communications exchange such as the removal of the address field. Messages placed in buffers 244, 246 by the ring access circuit 240 must be sent to the endpoint by transmission through the star endpoint transmitter 250. This is done simply by removing the data from the buffers and serially transmitting it over the media with an error detection field. Messages in the digitized message buffer have priority over and are always transmitted before messages in the data buffer. This is also true for the buffers in the communications exchange.

Figure 13:
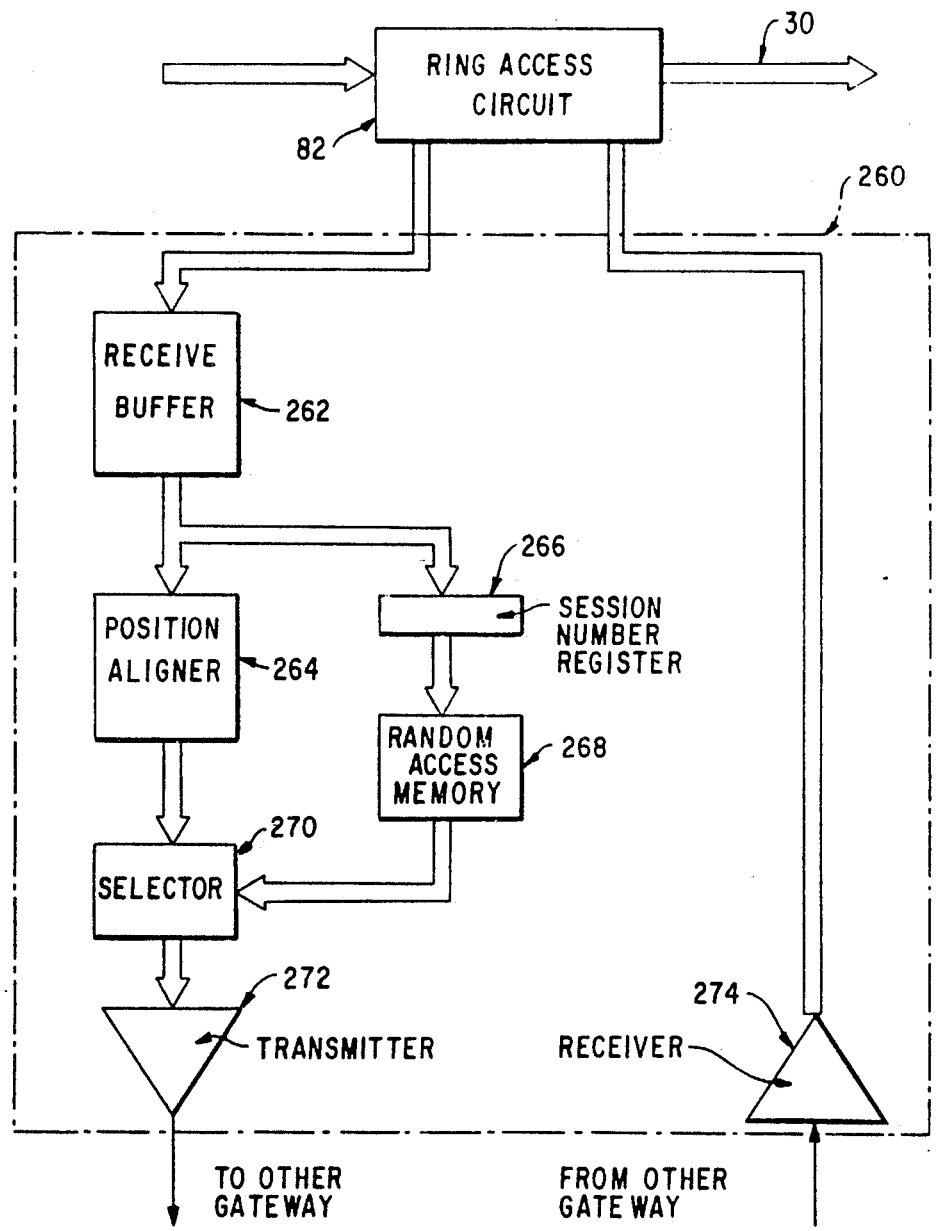
FIG. 13 is a block diagram of a gateway unit in the invention which makes possible communication between separate distinct networks.

The packet used in the invention has an address field of 2 bytes although longer or shorter fields may be used. Addressing a population of endpoints above the limits imposed by the address field is possible using gateway 70 of FIG. 13. The gateway operates as an address translation device whereby messages sent to the endpoint have an address change take place before the message is send on to a physically distinct network. In principle the message is addressed to the gateway and is recognized by ring access circuitry 82. As shown in FIG. 13, the ring access circuitry may be a serial ring access circuit 82 or it may be a parallel or partially parallel ring access circuit such as circuit 240 of FIG. 12. Gateway 70 further comprises a receive buffer 262, a position aligner 264, a session number register 266, a random access memory 268, a selector 270, a transmitter 272 and a receiver 274. Gateway 70 decodes the session field using session number register 266 and random access memory 268 which then provide a prestored and predetermined address which is put in place of the gateway address by selector 270. As the packet is transferred word by word (a word is two bytes in the preferred embodiment but may be other lengths) from the receive buffer 262 to the position aligner 264, the session number field is recorded in the session number register 266. The session number latched in the register decodes a table stored in random access memory 268 which outputs the new address and session number. The selector 270 outputs the new address and session number and discards the old address and session number from the position aligner. The selector then accepts the remainder of the packet from the position aligner and transfers the entire re-addressed packet to the transmitter 272. The newly addressed message is then transmitted to the adjacent network by the transmitter. Messages received from the other network through the other gateway are simply received by the receiver 274 and transferred to the ring access circuit 82. Alternatively, the gateway may be designed so that no address translation is performed on a transmitted message, but rather is performed on a received message.

Figure 14:
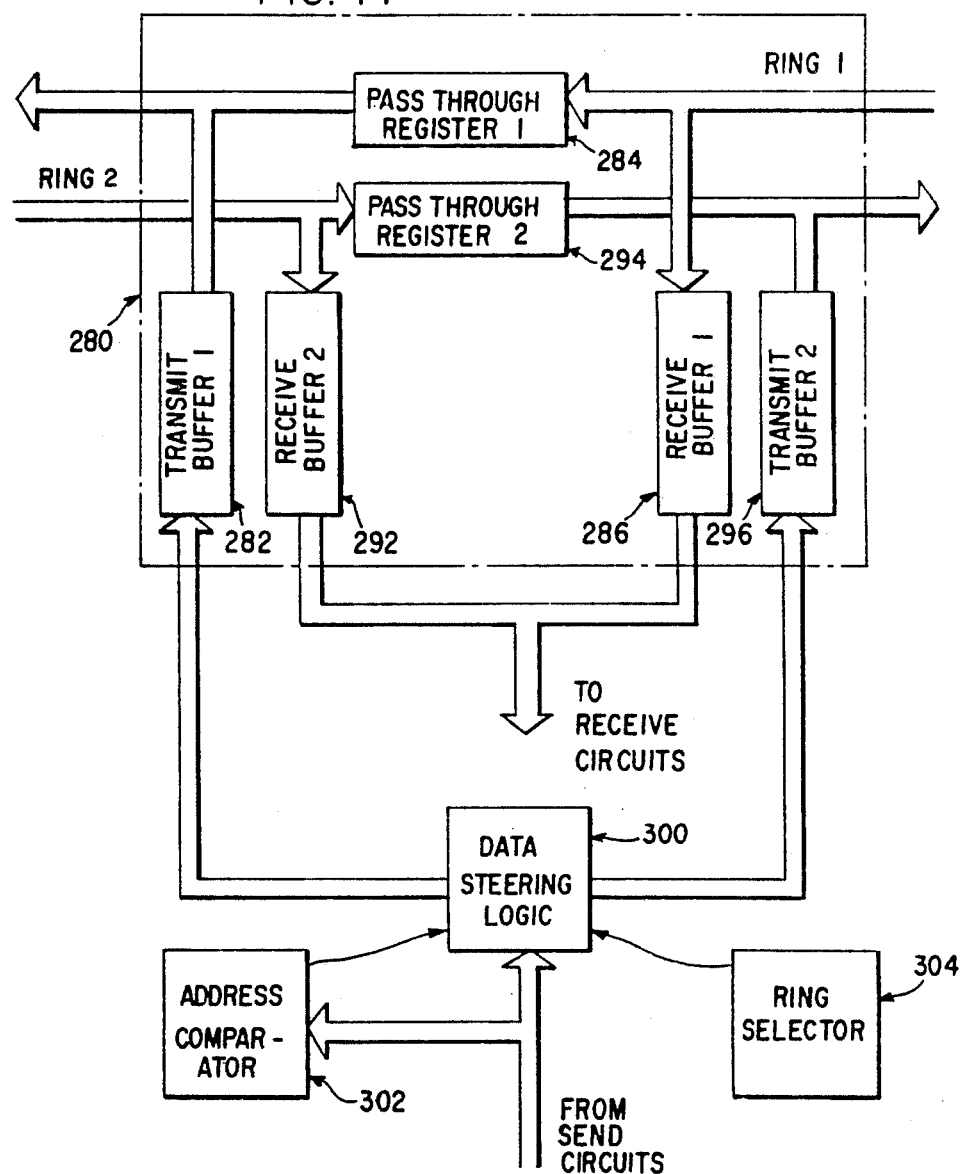
FIG. 14 is a block diagram of a variation of a switch unit in the invention whereby two rings transferring data in opposite directions are used.

Register insertion rings are fast and have high capacity. Unfortunately, they cannot tolerate faults in any endpoint. A fault in a single endpoint can cause the malfunotion of the entire ring. FIG. 14 is a block diagram of a dual ring switch 280 which is a variation of the ring access circuit that increases the security of the network against logic faults. In this variation two rings are used which transfer messages in opposite directions. Dual ring switch 280 must use data steering logic 300 to transmit messages in the proper direction. A ring selector 304 is utilized when a fault has occurred which incapacitates one of the rings. The data steering logic then directs all transmissions on the working ring. This solution can also provide increased transmission speed and capacity with the addition of an address comparator 302. This comparator compares the destination address of every packet to be transmitted with the address of the endpoint in which the dual ring switch is located. The packet is then transmitted on the ring which represents the shortest path to the destination. This method increases the capacity and reduces the latency of data transfer by factors of 4 and 2 respectively because the average path has been reduced by a factor of 2 while the number of paths has been increased by 2.

Figure 15:
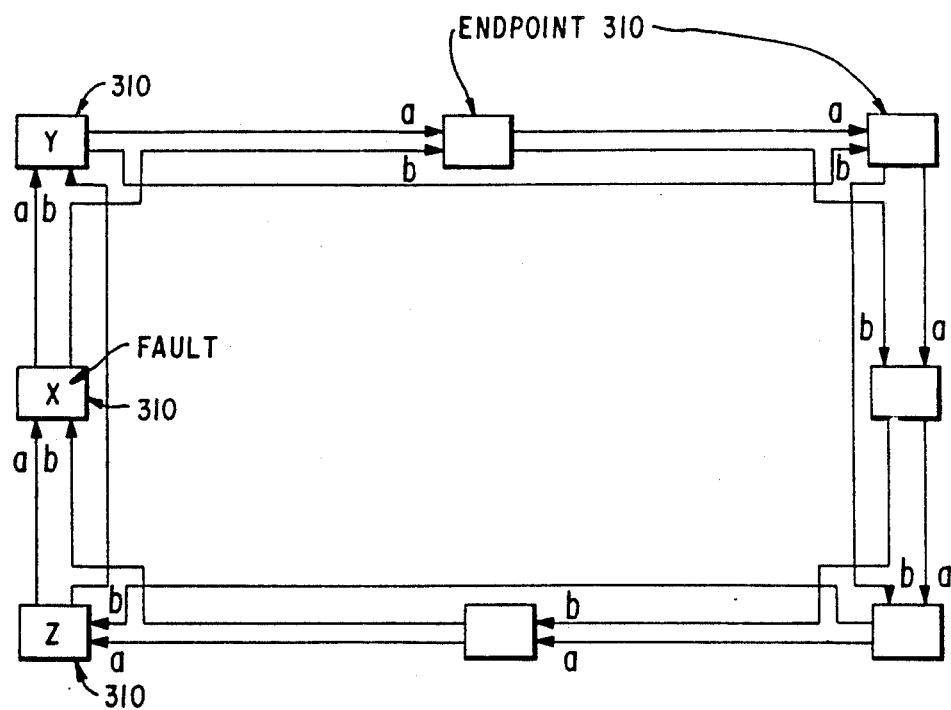
FIG. 15 is a block diagram of a ring of endpoints of the invention with an alternate wiring pattern to make the invention less susceptible to failure.

Another method for increasing the security of the network against failures in any endpoint is to provide bypass media such that a detected failure in an endpoint will cause that endpoint to be physically bypassed in the ring. In this way the faulty endpoint is isolated and disconnected while the remainder of the ring can operate undisturbed. As shown in FIG. 15, this method requires endpoints 310 to be interconnected using two media a, b, one of which is connected to the immediately preceding and immediately succeeding endpoint in the ring and the other of which is connected to the endpoints before and after the immediately preceding and immediately succeeding endpoints. This permits an endpoint immediately following a faulty endpoint to switch from receiving the information transmitted from the faulty endpoint through media a to receiving the information transmitted from an endpoint directly preceding the faulty endpoint through media b.

Figure 16:
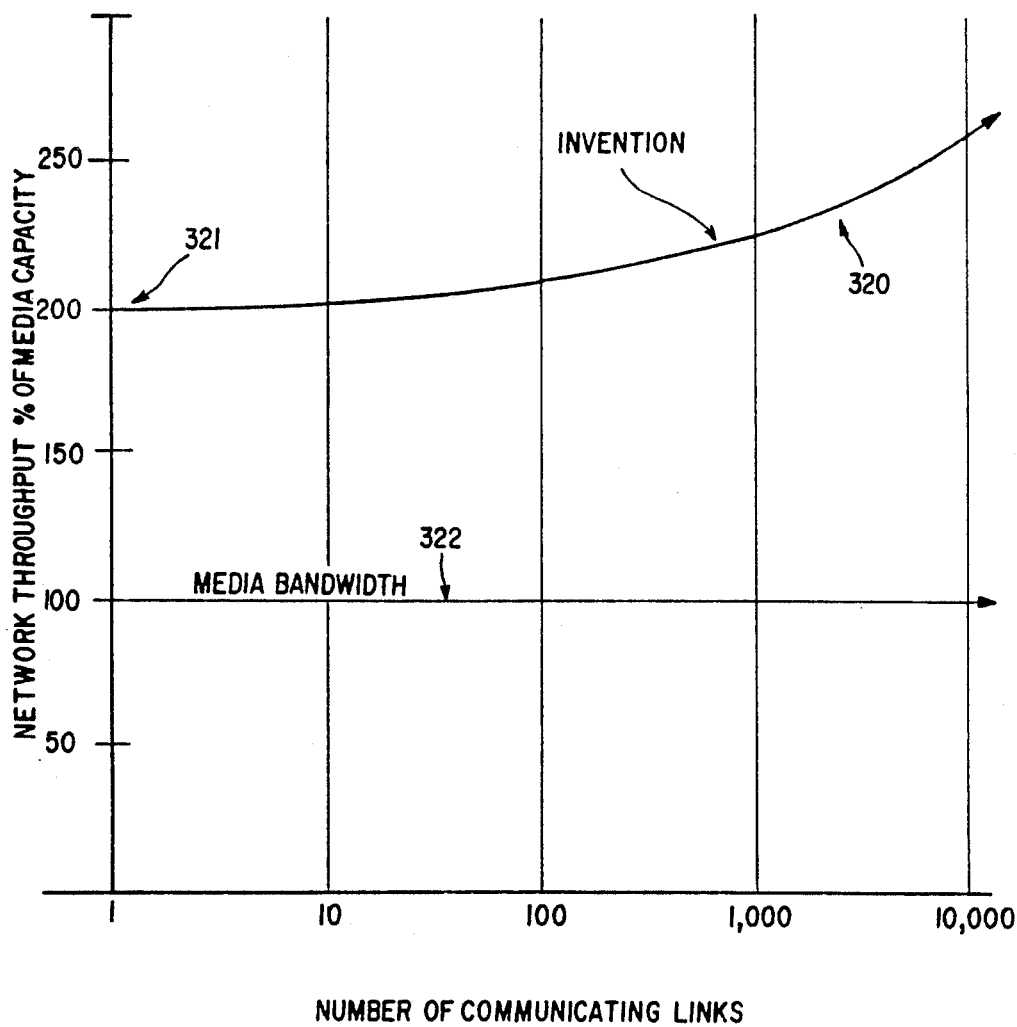
FIG. 16 is a graphic representation of the capacity of a single ring of endpoints in the invention as compared with the bandwidth of the media used for communication.

This invention is uniquely able to handle data, voice and video because of its high capacity, high speed, small time delay, and determinicity. FIG. 16 is a representation of the capacity 320 of a single ring of endpoints using a media with bandwidth 322. Minimum available capacity 321 is at least twice the media bandwidth because two paths exist to satisfy a full duplex exchange. As the number of endpoints increase, the network capacity can increase because of statistical concentration of the traffic. The full network also allows a high degree of concentration on its media because it switches (and therefore concentrates) the traffic very close to the traffic's source.

The high speed of the network is brought about by the facts that (a) no processor is used to actually packetize the data or digitized information; (b) the ring architecture is such that no collisions occur which require retries; (c) the hardware packetizing data and transmitting the packets can operate as fast or faster than the generation of the data or digitized information; (d) flow control is handled by a setting of DMA timing and not by softare protocols running in endpoint processors; and (e) in the case of digitized information which is handled solely by communication exchanges and voice/data communications exchanges, the bandwidth of the parallel or partially parallel ring capacity exceeds the highest probable data generation rate.

The high speed and determinicity of the invention arises from the use of modified register insertion rings which have a maximum delay of NxPL/(PxC) where N is the number of endpoints or ports on the ring, PL is the standard packet length, P is the degree of parallelism of the ring in number of bits, and C is the clocking frequency of the ring for data. In the preferred embodiment for the voice/data communications exchange N may be 100, PL is 192, P is 8 and C is 20 megahertz which creates a maximum delay of 120 microseconds neglecting transmission delay.

The high speed is also caused by the architecture which allows each endpoint to be always ready to receive a packet. The flow control of the speed of the traffic is not handled by software commands to avoid the slow speed of software commands running in processors. The buffers in each endpoint can accept expected bunching of packets caused by the network. Furthermore the endpoint specifies initially what the maximum reception speed is for its session upon session initiation. The transmitting endpoint uses this information to set the timing of its DMA circuit. Thus no processor running communications software is necessary while the data transfer is taking place.

This invention presents a novel method for communications which allows for transmission of all types of information in a distance insensitive network. The use of short, fixed format packets permits switching without processor involvement from endpoint to endpoint over a register insertion or slotted ring network. The short packets have fields specifying their type, a session identifier, a virtual memory address for data packets, and an error detection/correction field for error control. The resulting network has low delay, high speed, and is deterministic such that digitized voice and video information may be transmitted with minimal distortion. The network is also able to use any type of media. Error codes may be adapted and changed to fit the particular media being used on the section of the network involved. The network is able to provide multiple sessions and very fast data transfer. The terminal and computer interface devices are also able to perform programmable user support funotions such as protocol conversion and encryption.

What is claimed is:

1. In a digital communication system, a ring network for transmitting data in the form of addressed message packets comprising:
    a data bus, and
    a plurality of endpoints connected to said data bus, each of said endpoints comprising:
    means for establishing at each endpoint a unique address so that the addresses of the endpoints around the ring change monotonically from a first endpoint in the ring to a last endpoint in the ring,
    first, second and third data buffers, said first data buffer being connected to receive addressed message packets from the preceding endpoint and to pass said addressed message packets on to the next endpoint in the ring, said second data buffer being connected to receive addressed message packets from a preceding endpoint and to pass said message packet to a using device and said third data buffer being connected to receive an addressed message packet from said using device and pass it on to the next endpoint in the ring,
    means for determining if the message packet is addressed to said endpoint, for routing message packets addressed to said endpoint to said second buffer and for routing message packets addressed to other endpoints to said first buffer,
    a fourth buffer connected to provide data to said third buffer,
    a direct memory access circuit,
    a communications bus and
    a random access memory, said direct memory access circuit removing data from said random access memory and transferring the data via said communications bus to said fourth buffer at a predetermined rate, whereby data flow is determined by the direct memory access circuit and not by software flow control protocols.

2. The apparatus of claim 1 wherein each addressed message packet includes address information at the begining of the packet and the determining means comprises a comparator for comparing said address with the address of the endpoint.

3. The apparatus of claim 1 wherein the message packets can represent digital data or digitized analog information and message packets that represent digital data are routed around the ring if the second buffer at their addressed endpoint is full whereas message packets that represent digitized analog data are destroyed if the second buffer is full.

4. In a digital communication system comprising an asynchronous ring network for transmitting data in the form of addressed message packets, said network comprising a data bus and a plurality of endpoints connected to said data bus, a method of transmitting said addressed message packets asynchronously from one endpoint to another comprising the steps of:
    receiving a message packet at an endpoint,
    testing an address of said message packet relative to the address for the endpoint and routing said message packet addressed to other endpoints to a first buffer and routing message packets addressed to said endpoint to a second buffer, providing message packets from said second buffer to a using device, forming message packets of information to be transmitted from said using device and providing said message packets to a third buffer, and asynchronously routing a message packet in said third buffer to the next endpoint in the ring if there is no message packet being routed from said first buffer to said next endpoint, said routing being performed independently of other message packets in said ring.

5. In a digital communication system, a ring network for transmitting data in the form of addressed message packets comprising:

a data bus, and a plurality of endpoints connected to said data bus to form a ring, each of said endpoints comprising:

first, second and third data buffers, said first data buffer being connected to receive addressed message packets from the preceding endpoint and to pass said addressed message packets on to the next endpoint in the ring, said second data buffer being connected to receive addressed message packets from a preceding endpoint and to pass said message packet to a using device and said third data buffer being connected to receive an addressed message packet from said using device and pass it on to the next endpoint in the ring, means for determining if the message packet is addressed to said endpoint, for routing message packets addressed to said endpoint to said second buffer and for routing message packets addressed to other endpoint to said first buffer, a direct memory access circuit, a communications bus and a random access memory, said direct memory access circuit removing data from said random access memory and transferring the data via said communications bus to said third buffer at a predetermined rate, whereby data flow is determined by the direct memory access circuit and not by software flow control protocols.

6. In a digital communication system, an asynchronous ring network for transmitting data in the form of addressed message packets comprising:

a data bus, and a plurality of independently operating endpoints connected to said data bus to form a ring, each of said endpoints comprising:

first, second and third data buffers, said first data buffer being connected to receive addressed message packets from the preceding endpoint and to pass said addressed message packets on to the next endpoint in the ring, said second data buffer being connected to receive addressed message packets from a preceding endpoint and to pass said message packet to a using device and said third data buffer being connected to receive an addressed message packet from said using device and pass it on to the next endpoint in the ring, means for determining if the message packet is addressed to said endpoint, for routing message packets addressed to said endpoint to said second buffer and for routing message packets addressed to other endpoints to said first buffer, means for determining if a message packet is present in said first buffer and asynchronous means for passing a message packet from said third buffer to the next endpoint in the said ring when a message packet is not present in said first buffer, said means operating independently of other message packets in said ring.

7. The apparatus of claim 6 further comprising:

means for forming message packets of variable length, said message packet including information identifying the length of the message packet, and means for detecting in a received message packet information identifying the length of the message packet and for processing said received message packet in accordance with said length information.

8. In a digital communication system, a ring network for transmitting data in the form of addressed message packets comprising:

a data bus, and a plurality of independently operating endpoints connected to said data bus to form a ring, each of said endpoints comprising:

first, second and third data buffers, said first data buffer being connected to receive addressed message packets from the preceding endpoint and to pass said addressed message packets on to the next endpoint in the ring, said second data buffer being connected to receive addressed message packets from a preceding endpoint and to pass said message packet to a using device and said third data buffer being connected to receive an addressed message packet from said using device and pass it on to the next endpoint in the ring, means for determining if the message packet is addressed to said endpoint, for routing message packets addressed to said endpoint to said second buffer and for routing message packets addressed to other endpoints to said first buffer, means for forming message packets of variable length, said message packet including information identifying the length of the message packet, and means for detecting in a received message packet information identifying the length of the message packet and for processing said received message packet in accordance with said length information.

* * * * *